US011102642B1

(12) United States Patent
Lembke et al.

(10) Patent No.: US 11,102,642 B1
(45) Date of Patent: Aug. 24, 2021

(54) SYSTEM AND METHOD FOR ENHANCED COMMUNICATIONS ON A WIRELESS MESH NETWORK

(71) Applicant: D-tect Systems, Inc., Draper, UT (US)

(72) Inventors: Bryce Lembke, South Jordan, UT (US); Enoch Lee, West Valley City, UT (US); Paul Hepworth, South Jordan, UT (US)

(73) Assignee: D-tect Systems, Inc., Draper, UT (US)

( * ) Notice: Subject to any disclaimer, the term of this patent is extended or adjusted under 35 U.S.C. 154(b) by 747 days.

(21) Appl. No.: 14/266,786

(22) Filed: Apr. 30, 2014

Related U.S. Application Data

(60) Provisional application No. 61/817,741, filed on Apr. 30, 2013.

(51) Int. Cl.
*H04W 8/24* (2009.01)
(52) U.S. Cl.
CPC ..................... *H04W 8/24* (2013.01)
(58) Field of Classification Search
CPC .......... H04W 8/08; H04W 8/24; H04L 65/60; H04L 67/1097; H04L 67/18; H04L 45/126; H04L 9/0827
See application file for complete search history.

(56) References Cited

U.S. PATENT DOCUMENTS

| | | | | |
|---|---|---|---|---|
| 8,238,913 B1* | 8/2012 | Bhattacharyya | ...... | H04L 67/142 370/331 |
| 2005/0136972 A1* | 6/2005 | Smith | ..................... | H04B 3/542 455/554.1 |
| 2006/0039371 A1* | 2/2006 | Castro | ..................... | H04L 12/42 370/389 |
| 2006/0268679 A1* | 11/2006 | Deng | ......................... | H04J 3/14 370/216 |
| 2007/0192506 A1* | 8/2007 | Gupta | ................... | H04W 40/36 709/238 |
| 2008/0317047 A1* | 12/2008 | Zeng | ..................... | H04W 40/28 370/401 |
| 2010/0198032 A1* | 8/2010 | Simpson | ............... | A61B 5/0002 600/365 |

(Continued)

OTHER PUBLICATIONS

Wikipedia; Wikipedia—Gateway (Computing); 2018; https://en.wikipedia.org/wiki/Gateway_(telecommunications) (Year: 2018).*

*Primary Examiner* — Tonia L Dollinger
*Assistant Examiner* — Jihad K Boustany

(57) ABSTRACT

A wireless mesh network may have a plurality of nodes, each of which is able to dynamically establish itself as a gateway when a connection with an end-user device is detected. To route data to an end-user device, each node that is not, itself, a gateway to that device may route traffic along a path to the appropriate gateway. If a node does not have such a path in memory, it may broadcast an inquiry to all nodes with which communicates directly, to determine whether any of those nodes are a gateway to the end-user device, or have a path to the end-user device in memory. Thus, paths to gateways may propagate among the nodes. If multiple paths are available, a node may select the path that provides the best data transmission. Each node may replace pathways that are no longer valid, allowing the network to repair itself if needed.

9 Claims, 13 Drawing Sheets

(56) References Cited

U.S. PATENT DOCUMENTS

| | | | |
|---|---|---|---|
| 2010/0215019 A1* | 8/2010 | Velev | H04W 8/06 370/331 |
| 2011/0158210 A1* | 6/2011 | Cemper | H04W 40/20 370/338 |
| 2013/0148595 A1* | 6/2013 | Lee | H04W 76/10 370/329 |
| 2013/0183902 A1* | 7/2013 | McCarthy | H04B 7/24 455/41.2 |
| 2014/0269278 A1* | 9/2014 | Alexander | H04L 51/38 370/230 |

* cited by examiner

SYSTEM AND METHOD FOR ENHANCED COMMUNICATIONS ON A WIRELESS MESH NETWORK

TECHNICAL FIELD

The present invention relates to computer networking, and more specifically, to systems and methods for data routing and control through the use of a wireless mesh network.

BACKGROUND

Current wireless technologies often require predetermined network configurations and topologies. These may include pre-assigned role designations within the network in order to collect data and control nodes in the network. Often, these networks must be configured statically prior to deployment. Thus, they may have little capability to adapt to changing circumstances after deployment. Such networks may have difficulty responding to a variety of changes that could affect the network.

For example, if a user is using one node of the network as a gateway for communications over the network, and then changes to use a different node as the gateway, the network may not be able to route network traffic to the user's new location without manual selection of the new node as the gateway.

As another example, if a node within the network becomes disabled, traffic that relies upon the disabled node may not be properly routed. Again, manual adjustment of other network components may be required.

Furthermore, many wireless networks are relatively inefficient in how traffic is routed. Many networks may have no way for a node to effectively select a path for data based on signal strength, traffic minimization, or the like. Thus, such networks may not provide the speed and/or reliability of which their hardware may otherwise be capable.

What is needed is wireless networking systems and methods that remedy the deficiencies of the prior art.

SUMMARY

The present invention provides wireless mesh network systems and methods that may remedy the shortcomings of prior art wireless networks. A wireless network system may have a plurality of nodes, each of which can serve as a gateway to an end-user device. Each of the nodes may be positioned within direct wireless communication range of one or more of the other nodes ("neighboring nodes").

When a connection between a node and an end-user device is established, the node may automatically detect the connection. If the node receives a response to data transmission to the end-user device, the node may appoint itself as a gateway. Similarly, if such a connection is terminated, or if the end-user device stops responding to data transmissions from the node, the node may unappoint itself as a gateway.

Paths to each gateway and/or non-gateway node may propagate through the system. Each of the nodes may route traffic according to paths in a route table. If a node does not have a path to a gateway, the node may broadcast a gateway inquiry to its neighbors. Any neighbor that is a gateway or has identified a gateway may transmit a response. The inquiring node may copy the path from the response to its route table.

If a node receives multiple responses to a gateway inquiry, it may select the best one for traffic routing. This may be done by comparing each response to the paths that have been identified before. A minimum signal strength may be prioritized such that only paths with a predetermined minimum signal strength will be considered, unless there are no paths with the minimum signal strength. Thus, packet loss may be kept to a minimum. If multiple paths have the required minimum signal strength, they may be compared on the basis of how many "hops" they contain. Shorter paths (with fewer hops) may be prioritized to minimize network traffic.

Each node may actively monitor the status of the paths it has identified, and may periodically test each one. This may be done through the use of a countdown that is decremented whenever no response is received to acknowledge data sent to a location in the system. When the countdown reaches zero, the node may broadcast a gateway inquiry to its neighbors to initiate the process of identifying a new path to replace the defective one. Thus, the nodes of the system may "self-heal" to compensate for disconnections, equipment failures, and/or other disturbances of the system.

The minimum acceptable RSSI value may be determined for the system by placing two nodes a fixed distance apart, with one connected to an end-user device. Both nodes may transmit data to the end-user device including signal strength data. If the nodes transmit with an acceptable packet loss and/or delay, the distance between them may be incremented and new data packets may be transmitted with new signal strength values. Once the packet loss and/or delay exceed a predetermined threshold, the signal strength values of the nodes that produced the last acceptable packet loss and/or delay rate may be used as the minimum signal strength for the system. This minimum signal strength may be used to select from multiple available paths as discussed previously.

When a node is disconnected from an end-user device, the node may, after unappointing itself as a gateway, broadcast notice of the unappointment to its neighbors. Each node that receives such a notice may re-transmit it to its neighbors. Thus, notice of the unappointment may be propagated through the system so that the nodes can update their routing tables to delete the outdated gateway information. The nodes may then re-commence the process of identifying gateways and/or paths to replace those that were deleted.

DETAILED DESCRIPTION

Various embodiments of the invention will now be described in greater detail in connection with FIGS. 1-12. The drawings and associated descriptions are merely exemplary; the scope of the invention is defined not by these, but by the appended claims.

Figure 1:
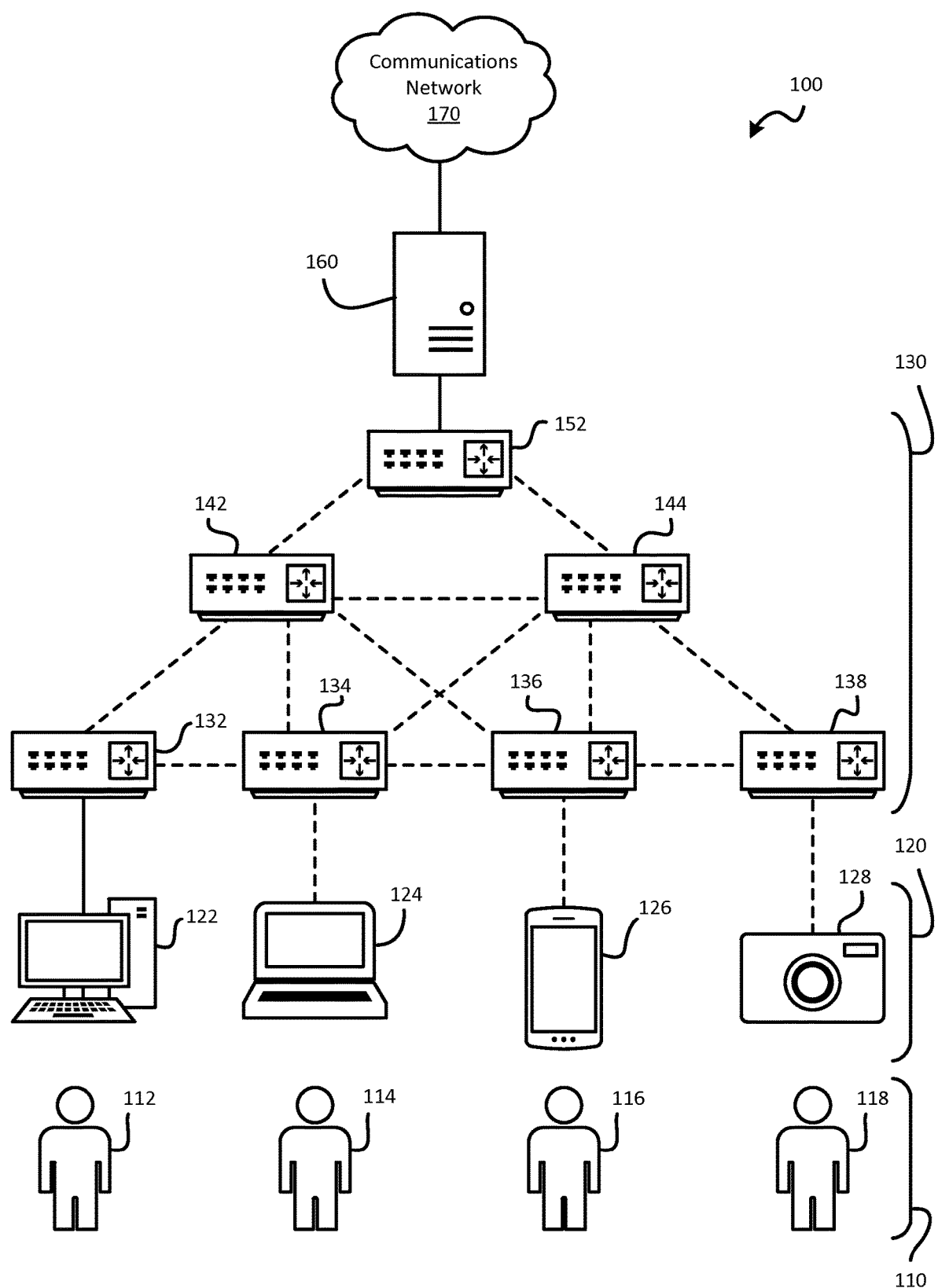
FIG. 1 is a schematic block diagram of a wireless mesh network system, and related components, according to one embodiment of the invention.

Referring to FIG. 1, a schematic block diagram illustrates a wireless mesh network system, or system 100, and related components, according to one embodiment of the invention. The system 100 may be designed to transmit information among one or more end-users 110. In the exemplary view of FIG. 1, the end-users 110 may include a first end-user 112, a second end-user 114, a third end-user 116, and a fourth end-user 118.

The end-user 110 may access the system 100 through the use of end-user devices 120. The end-user devices 120 may include any of a wide variety of computing devices, including but not limited to a first end-user device 122 in the form of a desktop computer, a second end-user device 124 in the form of a laptop computer, a third end-user device 126 in the form of a smartphone, and a fourth end-user device 128 in the form of a digital camera. Those of skill in the art will appreciate that a wide variety of end-user devices besides those specifically shown in FIG. 1 may be used in connection with the present invention.

The system 100 may include a plurality of nodes 130, each of which may be designed for wireless and/or wired communication with each other and/or with other devices such as the end-user devices 120. In FIG. 1, wireless connections are shown, by way of example, with dashed lines, while wired connections are shown with solid lines. The nodes 130 may communicate on any known wired and/or wireless protocol, including but not limited to Ethernet, USB, RS-232, Wi-Fi, Bluetooth, Bluetooth Smart, near-field communications (NFC), cellular, and the like. Such communications may take place over any range of the electromagnetic band, including but not limited to radio frequency (RF), infrared (IR), and microwave.

The nodes 130 may be arranged throughout a structure, city, or other area in order to provide access to the system 100 for the end-user devices 120, which may also be in locations that are displaced from each other. Each of nodes 130 may have a limited range of wireless communication so that some of the nodes 130 are in direct wireless communication range of each other and some are not, and thus can only communicate with each other through one or more intervening nodes.

In the example of FIG. 1, the nodes 130 may include a first node 132 in direct communication with the first end-user device 122, a second node 134 in direct communication with second end-user device 124, a third node 136 in direct communication with the third end-user device 126, and a fourth node 138 in direct communication with the fourth end-user device 128. As shown, the second node 134 may be within direct wireless communication of the first node 132 and the third node 136. Similarly, the third node 136 may be within wireless communication range of the fourth node 138. However, the first node 132 may be too far from the third node 136 or the fourth node 138 for direct wireless communication with either of them, and the second node 134 may likewise be out of direct wireless communication range of the fourth node 138.

The nodes 130 may further include a fifth node 142 that communicates directly with the first node 132 and the second node 134, and a sixth node 144 that communicates directly with the third node 136 and the fourth node 138. The fifth node 142 and the sixth node 144 may be within wireless communication range of each other, and of a seventh node 152 that connects the remainder of the system 100 to a server 160. The server 160 may store data and/or serve as a gateway to a communications network 170, which may be public network, such as the Internet, or a private network such as an Intranet.

Thus, the nodes 130 may enable each of the end-user devices 120 to communicate wirelessly with each other, with the server 160, and/or with the communications network 170. A permissions system may be used to determine which of the end-user devices 120 is able to access the other end-user devices 120, various portions of the server 160, and the communications network 170.

Figure 2:
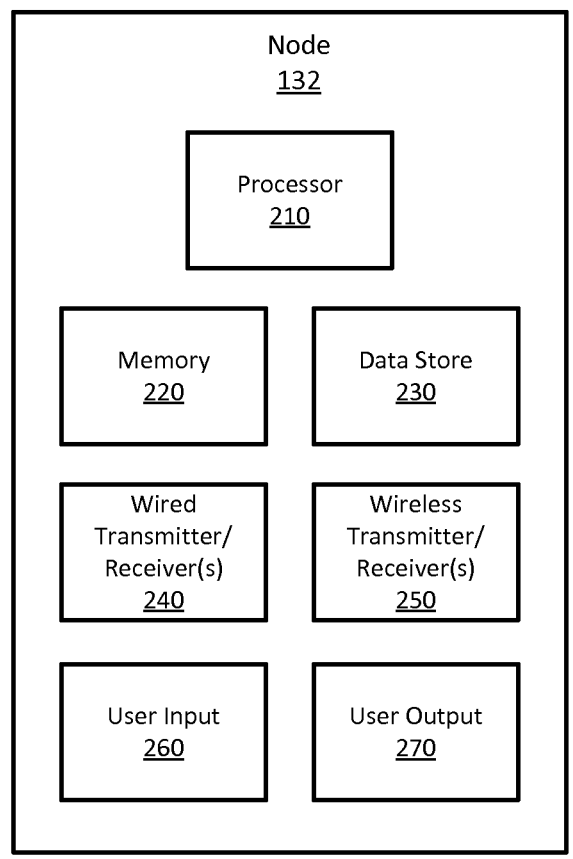
FIG. 2 is a schematic block diagram of the first node of the system of FIG. 1.

Referring to FIG. 2, a schematic block diagram illustrates the first node 132 of the system 100 of FIG. 1. Each of the nodes 130 may advantageously have a configuration identical to that of the other nodes 130 of the system 100, with the exception of an IP address, MAC address, or other identifying feature. Thus, the nodes 130 may be interchangeably positionable within the system 100. In the event that one of the nodes 130 is faulty, it may be replaced with another that is substantially identical to it. Thus, the first node 132, as shown in FIG. 2, may represent any of the nodes 130 of the system 100.

As shown, the first node 132 may have a processor 210, which may receive and process data. The processor 210 may be of any known type, including but not limited to microprocessors, application-specific integrated circuits (ASICs), field-programmable gate arrays (FPGA's), and the like. In addition, the first node 132 may have a memory 220 and a data store 230. The memory 220 may be volatile memory that stores operating instructions, routing tables, and/or other data related to the operation of the processor 210. The data store 230 may have non-volatile memory that stores computer program code and/or other data pertinent to the operation of the first node 132.

The first node 132 may also have one or more wired transmitter/receiver(s) 240 and/or wireless transmitter/receiver(s) 250. The wired transmitter/receiver(s) 240 may utilize various wired connectors, such as USB connectors, Ethernet connectors, and the like to connect to other devices, such as the server 160 and the first end-user device 122 in the example of FIG. 1. The wired transmitter/receiver(s) 240 may be designed to utilize any one or more wired communications protocols, including but not limited to those listed in the description of FIG. 1.

The wireless transmitter/receiver(s) 250 may utilize various antennas, such as Wi-Fi radio frequency antennas, NFC antennas, or the like, to connect to other devices, such as the second end-user device 124, the third end-user device 126, and the fourth end-user device 128 in the example of FIG. 1. The wireless transmitter/receiver(s) 250 may be designed to utilize any one or more wireless communications protocols, including but not limited to those listed in the description of FIG. 1.

The first node 132 may also optionally have a user input 260 and/or a user output 270 that enable a user, such as one of the end-users 110, to communicate directly with the first node 132. Such direct communication may be useful to activate, deactivate, and/or modify the operating settings of the first node 132. The user input 260 may include any known input device or combination of input devices whether triggered by humans, other systems, or changing conditions in the physical environment (temperature, radiation, tripwires, motion, sound, etc.), including but not limited to analog sensors, digital sensors, cameras, microphones, buttons, a touch screen, a key board, a mouse, a track pad, a track ball, and the like. The user output 270 may also include any known output device or combination of output devices, including a screen, a touch screen, one or more lights such as LED lights, a speaker, a buzzer, motors, switches, and/or the like. However, as mentioned previously, the user input 260 and the user output 270 are optional; if desired, the first node 132 may be designed to communicate with the end-users 110 only wirelessly via other devices such as the end-user devices 120.

The first node 132 is not limited to the components illustrated in FIG. 2. Rather, the first node 132 may include any of a wide variety of other components known in the art, including but not limited to a bus system, which conveys data between the components shown in FIG. 2, a power supply, and the like.

The nodes 130 may be interchangeably operable as gateways for the end-user devices 120. Any of the end-user devices 120 may thus establish a communication link with any of the nodes 130. When such a link is initiated, the node 130 to which the end-user device 120 has connected may automatically appoint itself as a gateway for communications with the end-user device 120 through the system 100. One way in which this may be done will be shown and described in connection with FIG. 3, as follows.

Figure 3:
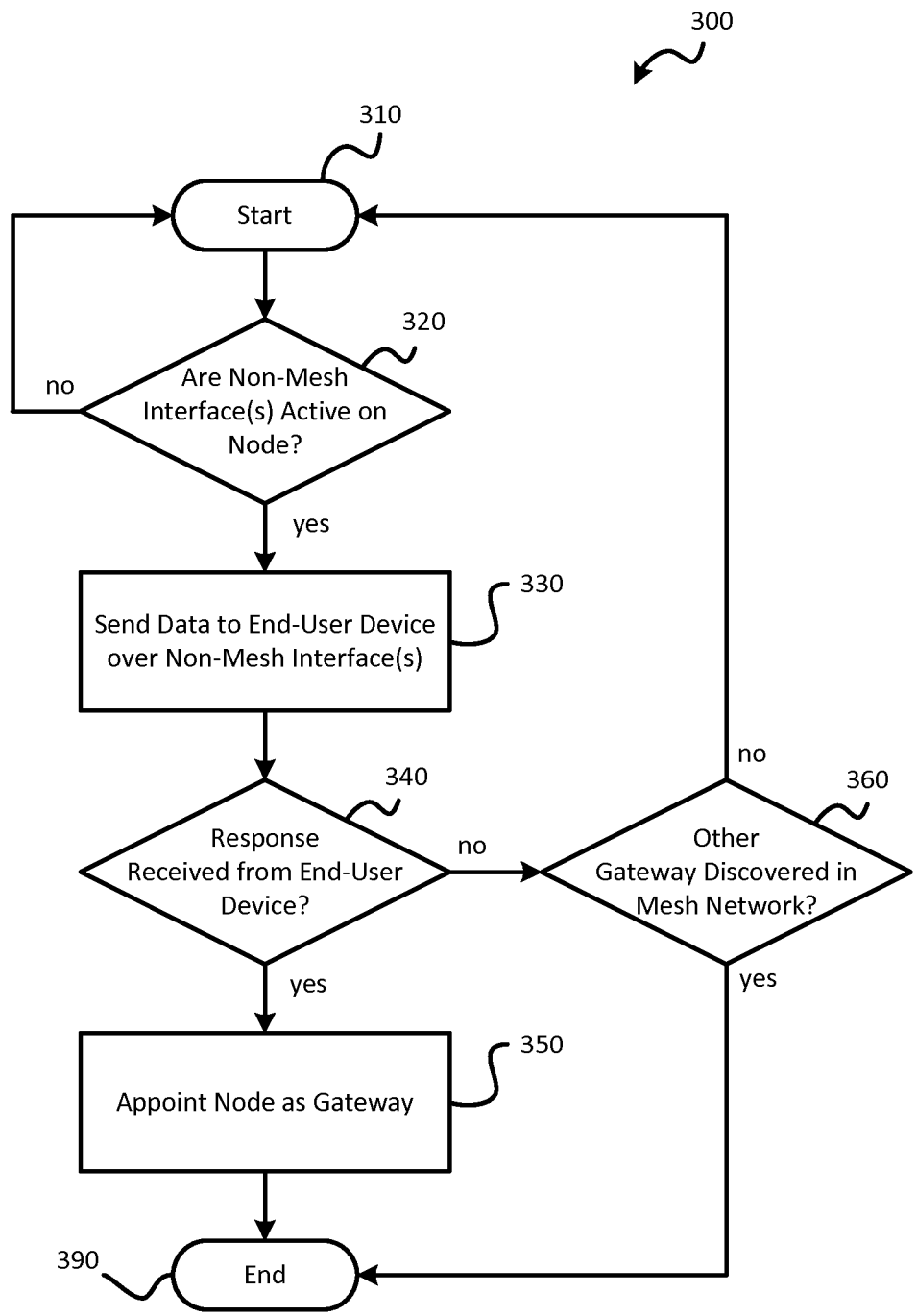
FIG. 3 is a flowchart diagram of a method of appointing a node of the system of FIG. 1 as a gateway to an end-user device.

Referring to FIG. 3, a flowchart diagram illustrates a method 300 of appointing one of the nodes 130 of the system 200 of FIG. 1 as a gateway to one of the end-user devices 120. The method 300 may be performed within the node 130, such as the first node 132 of FIG. 2. Thus, the method 300 may be carried out by the processor 210 through the use of computer program code encoded on the memory 220 and/or the data store 230. If desired, the method 300 may be performed entirely within the node 130 so that no outside hardware and/or user input are needed in order to carry out the method 300. The method 300 is applicable to any of the nodes 130, but will be described in connection with the first node 132 by way of example.

As shown, the method 300 may start 310 with a query 320 in which the first node 132 determines whether any non-mesh interface(s) are active on the first node 132, i.e., whether the first node 132 is in communication with any other device besides the other nodes 130. Thus, the query 320 may entail checking the wired transmitter/receiver(s) 240 and/or the wireless transmitter/receiver(s) 250 for activity that is not communication with one of the other nodes 130 of the system 100. If such activity is occurring, the first node 132 may infer that a non-mesh interface is active in the first node 132. This may mean that an external device, such as the first end-user device 122 of FIG. 1, has been connected to the first node 132 via a wired and/or wireless connection.

If a non-mesh interface is not present on the first node 132, the method 300 may return to the start 310. The first node 132 may then iterate through the method 300 again, for example, after passage of a predetermined time frame after the last iteration.

If a non-mesh interface is present on the first node 132, the method 300 may proceed to a step 330 in which the first node 132 sends data to the device connected to it over the non-mesh interface (for example, the first end-user device 122 of FIG. 1). The data may simply be a request for a response or the like.

Then, the method 300 may proceed to a query 340 in which the first node 132 determines whether a response has been received from the first end-user device 122. The query 340 may be carried out after a predetermined period of time has elapsed from the transmission of the data to the first end-user device 122 in the step 330. If the response has been received, the first node 132 may infer that it should now act as a gateway for the first end-user device 122. Thus, the method 300 may proceed to a step 350 in which the first node 132 appoints itself as a gateway for network communications with the first end-user device 122.

If a response has not been received from the first end-user device 122 within the predetermined time, the method 300 may instead proceed to a query 360 in which the first node 132 determines whether another gateway has been discovered within the system 100. The query 360 may ascertain the existence of a gateway to a particular device of the end-user devices 120, or may ascertain the existence of any gateway.

If such a gateway has been discovered within the system 100, the method 300 may end 390. If such a gateway has not been discovered, the method 300 may return to the start 310 and iterate until the first node 132 appoints itself a gateway or has discovered a gateway elsewhere in the system 100.

Once the first node 132 has appointed itself a gateway, it may be discoverable by other nodes 130 of the system 100, for example, as will be shown and described in connection with FIGS. 5-6E. Such gateway discovery may propagate through the 100 until each of the nodes 130 has discovered all gateways to all of the end-user devices 120 connected to the system 100. Other nodes 130 of the system 100 and thus, the server 160 and/or other end-user devices 120, may then successfully route traffic to each of the end-user devices 120.

It may also be desirable for the nodes 130 that have appointed themselves as gateways to be able to "unappoint" themselves as gateways when there is no longer an active connection to a device such as one of the end-user devices 120. Thus, when a connection between a node 130 and an end-user device 120 is terminated or becomes inactive, the node 130 may discontinue routing traffic to an end-user device 120 that is no longer connected to it. This will be shown and described in connection with FIG. 4.

Figure 4:
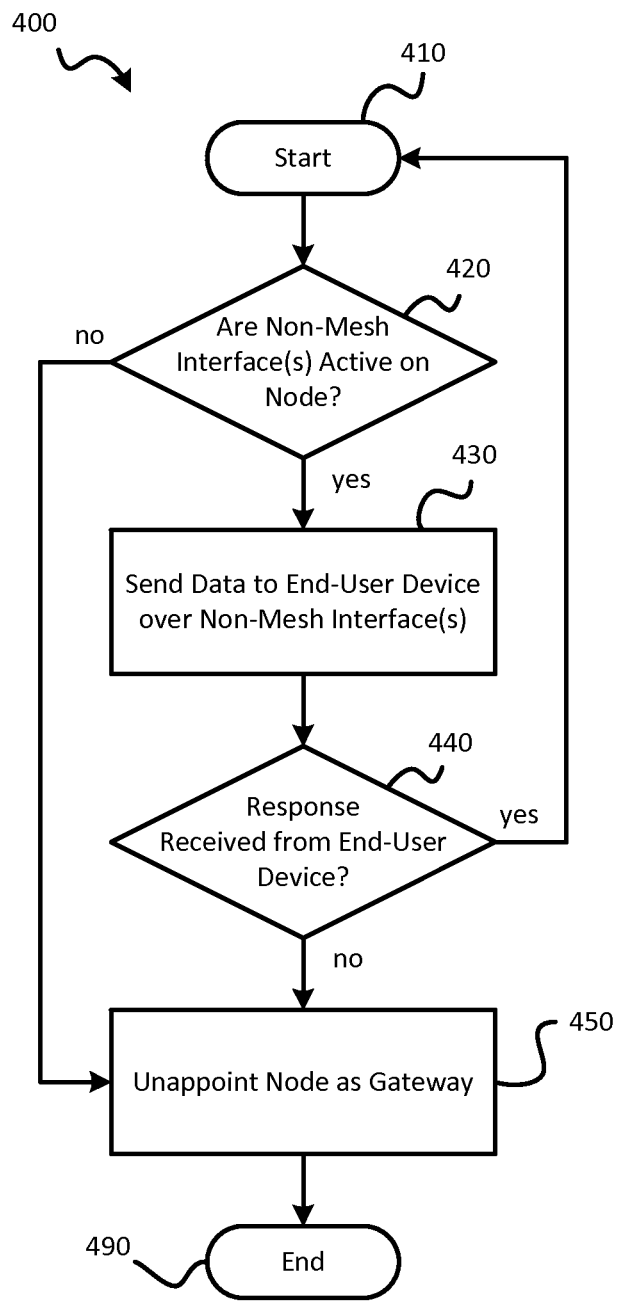
FIG. 4 is a flowchart diagram of a method of unappointing a node of the system of FIG. 1 as a gateway to an end-user device.

Referring to FIG. 4, a flowchart diagram illustrates a method 400 of unappointing one of the nodes 130 of the system 100 of FIG. 1 as a gateway to one of the end-user devices 120. The method 400 may be used for a node 130, such as the first node 132 that has appointed itself as a gateway, for example, through the performance of the method 300 of FIG. 3.

As shown, the method 400 may start 410 with a query 420 in which the first node 132 determines whether any non-mesh interface(s) are active on the first node 132, i.e., whether the first node 132 is in communication with any other device besides the other nodes 130. If desired, the query 420 may be carried out in a manner similar to, or even identical to, that of the query 320. Thus, the query 420 may entail checking the wired transmitter/receiver(s) 240 and/or the wireless transmitter/receiver(s) 250 for activity that is not communication with one of the other nodes 130 of the system 100. If such activity is occurring, the first node 132 may infer that a non-mesh interface is still active in the first node 132. This may mean that the external device, for example, the first end-user device 122 of FIG. 1, is still connected to the first node 132 via a wired and/or wireless connection.

However, if no such activity is occurring, it may signify that the first end-user device 122 has been disconnected from the first node 132. In such an event, the method 400 may proceed to a step 450, in which the first node 132 is unappointed as a gateway. The method 400 may then end 490.

Figure 12:
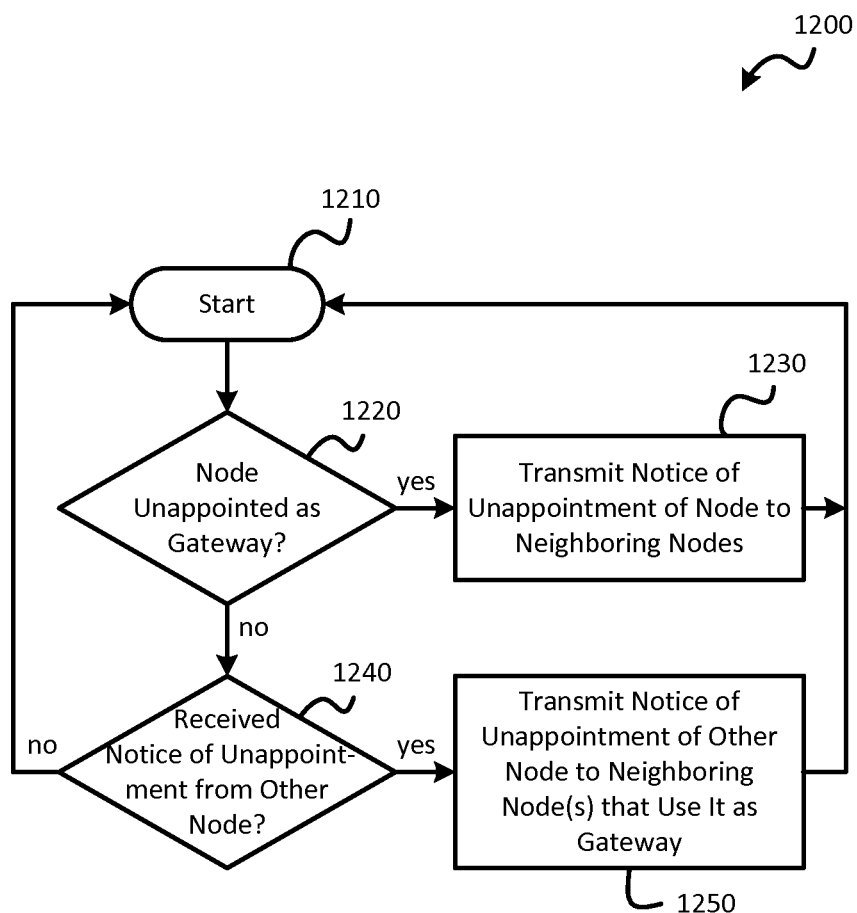
FIG. 12 is a flowchart diagram of a method of transmitting notice through the system of FIG. 1 that a node is no longer a gateway.

When the first node 132 unappoints itself as a gateway, it may broadcast its new status to other nodes 130 of the system 100, as in the method 1200 of FIG. 12 so that they will stop attempting to route data to the first end-user device 122 via the first node 132. Upon receiving the notice of unappointment, the other nodes 130 may also initiate a method 500 to establish a connection to alternative appointed gateway devices, as will be shown and described in connection with FIG. 5. Alternatively, the first node 132 may only transmit its new status to other nodes 130 that transmit inquiries to the first node 132. In either case, the new status of the first node 132 may be propagated through the system 100 in a manner similar to that which occurs when the first node 132 appoints itself a gateway, as in the method 300 of FIG. 3.

If the connection to the first end-user device 122 is still active, the method 400 may proceed to a step 430 in which data is sent to the first end-user device 122 by the first node 132 over the connection. Then, in a query 440, the method 400 may determine whether the first end-user device 122 is responsive. It is possible that the connection between the first node 132 and the first end-user device 122 is still active, but the first end-user device 122 is no longer able to receive data intended for the first end-user 112. For example, the first end-user 112 may have logged out of the first end-user device 122 or placed the first end-user device 122 in a non-transmitting status. If the connection between the first end-user device 122 and the first node 132 has no significant purpose, it may be desirable to unappoint the first node 132 as a gateway in spite of the fact that the connection is still active.

Accordingly, if, pursuant to the query 440, a response is not received form the first end-user device 122, for example, within a predetermined time frame, the first node 132 may unappoint itself as a gateway in the step 450, as though the connection with the first end-user device 122 were no longer active. The method 400 may then end 490.

Conversely, if, pursuant to the query 440, a response is received from the first end-user device 122, the first node 132 may infer that the connection with the first end-user device 122 is both active and in use. Thus, the method 400 may return to the start 410 and the first node 132 may iterate again through the method 400, for example, after a predetermined amount of time has passed since the last iteration. If desired, the first node 132 may continue iterating through the method 400 for as long as the first node 132 is appointed as a gateway.

As mentioned previously, the status of a node 130 of the system 100 as a gateway may propagate through the nodes 130 so that each of the nodes 130 has, in memory (for example, in the memory 220 and/or the data store 230), a record of which of the nodes 130 are gateways and the appropriate paths to reach them. The process of identifying gateways among the nodes 130 will be shown and described in greater detail in connection with FIGS. 5-6E. Determination of the best path to reach a gateway will be shown and described in greater detail in connection with FIGS. 7-9B.

Figure 5:
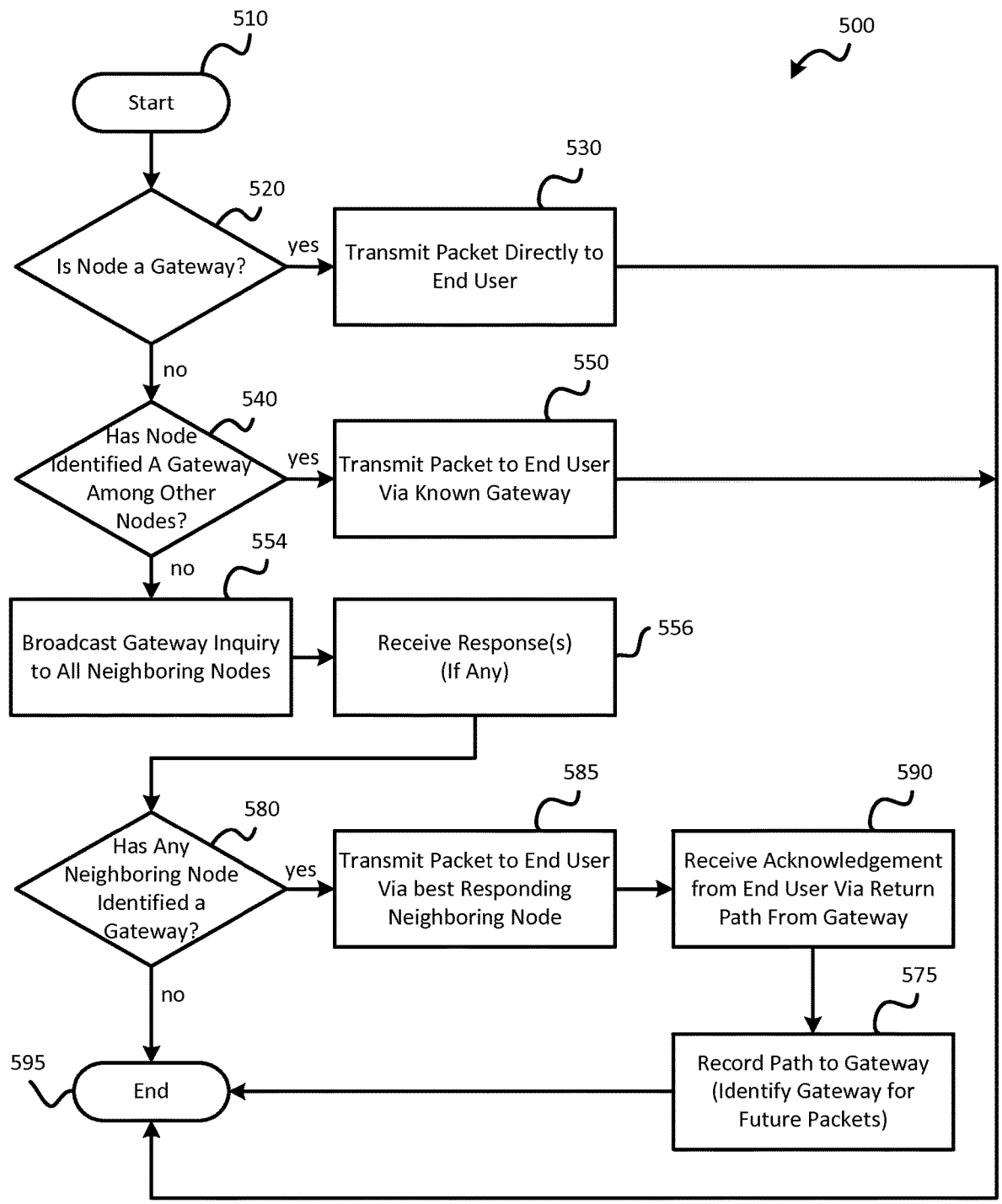
FIG. 5 is a flowchart diagram of a method of identifying a gateway and path of the system of FIG. 1.

Referring to FIG. 5, a flowchart diagram illustrates a method 500 of identifying a gateway and path of the system 100 of FIG. 1. The method 500 may be employed iteratively until the node 130, for example, the first node 132, has identified all gateways of the system 100. Additionally or alternatively, the method 500 may be pursued when the first node 132 has received data that needs to be forwarded to a particular gateway within the system 100. Thus, checking for gateways, in the following method, may entail checking for a particular gateway (to route a particular piece of information) or checking for any gateway (in the event that the first node 132 is simply locating other gateways, in general, in the system 100).

As shown, the method 500 may start 510 with a query 520 in which the first node 132 determines whether it is, itself, a gateway. This may be carried out, for example, by checking the memory of the first node 132 (for example, the memory 220 and/or the data store 230) for an indicator that the first node 132 has appointed itself as a gateway, as in the method 300 of FIG. 3 (without subsequently unappointing itself as a gateway as in the method 400 of FIG. 4).

If the first node 132 has appointed itself as a gateway, the method 500 may proceed to a step 530 in which data (i.e., one or more packets, depending on the protocol used) is transmitted to the end-user device 120 (for example, the third end-user device 126) directly from the first node 132. If the first node 132 has not appointed itself as a gateway, or has more recently unappointed itself as a gateway, the method 500 may instead proceed to a query 540 in which the first node 132 determines whether the first node 132 has identified a gateway among the other nodes 130 of the system 100. This may entail, again, checking the memory 220 and/or the data store 230 for information stored regarding the other nodes 130 of the system 100. Such information may be stored in a route table or the like, as will be shown and described in greater detail in connection with FIGS. 6A through 6E.

If the first node 132 has already identified a gateway among the other nodes 130, the method 500 may proceed to a step 550 in which the first node 132 transmits the data to the appropriate end-user devices 120 via the known gateway. This may entail the use of a path that has already been identified by the first node 132, as will be described subsequently.

If the first node 132 has not identified a gateway among the other nodes 130, the method 500 may proceed to a step 554 in which the first node 132 broadcasts a gateway inquiry to all of the nodes 130 that are neighbors (i.e., within direct wireless communication range) of the first node 132. In the example of FIG. 1, this may entail transmission of the gateway inquiry from the first node 132 to the second node 134 and the fifth node 142 since they are the only nodes 130 that directly communicate with the first node 132.

The gateway inquiry may be interpreted by other nodes 130 as a request for any available information regarding gateways among, or identified by, the nodes 130 that are neighbors to the first node 132. Each of the nodes 130 that receives the gateway inquiry may respond (1) if the node 130 is, itself, a gateway, or (2) the node 130 has identified a gateway among the other nodes 130 of the system 100.

Thus, in a step 556, the first node 132 may receive responses, if any, from the nodes 130 that are neighbors to it. If desired, the first node 132 may wait for a predetermined period of time prior to proceeding with the method 500 to provide sufficient time for responses to be received from its neighbors. Each response may indicate whether the transmitting node 130 is a gateway and/or the path to a gateway previously identified by the transmitting node 130.

The method 500 may proceed to a query 580 in which the first node 132 may determine whether any of the nodes 130 that are neighbors to it either are a gateway themselves or have identified a gateway. Making this determination may include processing the responses from the nodes 130 that are neighbors to the first node 132 to ascertain whether any of them provide a path to a gateway (including a path to themselves if they themselves are gateways). If any of these nodes 130 have transmitted a response containing a path to a gateway, the method 500 may proceed to a step 585 in which data is transmitted to the end-user device 120 (for example, the third end-user device 126) via the node 130 that is the first in the path provided in the response. If the responses contain multiple paths, the first node 132 may transmit the data to the third end-user device 126 via the node 130 that is considered the best path to the third end-user device 126, as will be described subsequently. It is noted that a node 130 that has identified a gateway, but is not itself a gateway may be selected as providing a better path compared to a node 130 that is itself a gateway. This may be the case due to the fact that other criteria may be taken into consideration by a node 130 to select the best path to a gateway, besides the number of "hops" needed to reach the gateway, as will be described in greater detail subsequently.

The method 500 may then proceed to a step 590 in which the first node 132 receives an acknowledgement from the third end-user device 126 via a return path, which may be the inverse of the path along which the data was sent from the first node 132 to the gateway node of the nodes 130. The acknowledgement may indicate that the data was received by the third end-user device 126. The method 500 may then proceed to a step 575 in which the path to the third end-user device 126 is recorded in the first node 132 for future use (sending data to the third end-user device 126 or responding to gateway inquiries from other nodes 130 of the system 100). Thus, in future iterations of the method 500, the first node 132 may not need to proceed to the query 580, but may instead answer the query 540 in the affirmative and proceed with the step 550, until the first node 132 receives notification that the node 130 through which the data was sent is no longer a gateway. The method 500 may then end 595.

If no response is received from the nodes 130 that are neighbors to the first node 132, the method 500 may also end 595 and/or return to the start 510 for further iteration. As mentioned previously, the nodes 130 that are neighbors to the first node 132 may only respond to the gateway inquiry if they are a gateway or have identified a gateway. However, in alternative embodiments, responses may be sent to the first node 132 by these nodes to indicate that they are not gateways and/or they have not identified gateways. In such an event, the method 500 may end 595 if none of the responses received by the first node 132 provides a gateway that can be used to transmit data to the third end-user device 126.

As mentioned previously, the method 500 may be iterative. If desired, the method 500 may repeat if data was successfully transmitted to the third end-user device 126 and/or if no such successful transmission was accomplished. One example of performance of the method 500 of FIG. 5 will now be shown and described in connection with FIGS. 6A-6E.

Referring to FIGS. 6A-6E, schematic block diagrams illustrate a portion 600 of the system 100 of FIG. 1, illustrating the identification of a gateway and path to one of the end-user devices 120, as in the method 500 of FIG. 5. For this example, the portion 600 includes the first node 132 (labeled "A"), the second node 134 (labeled "B"), and the third node 136 (labeled "C"). The first node 132 may have a first node route table 632 that lists routes (i.e., paths) that have been identified by the first node 132. Similarly, the second node 134 may have a second node route table 634 that lists routes that have been identified by the second node 134, and the third node 136 may have a third node route table 636 that identifies routes that have been identified by the third node 136.

Figure 6A:
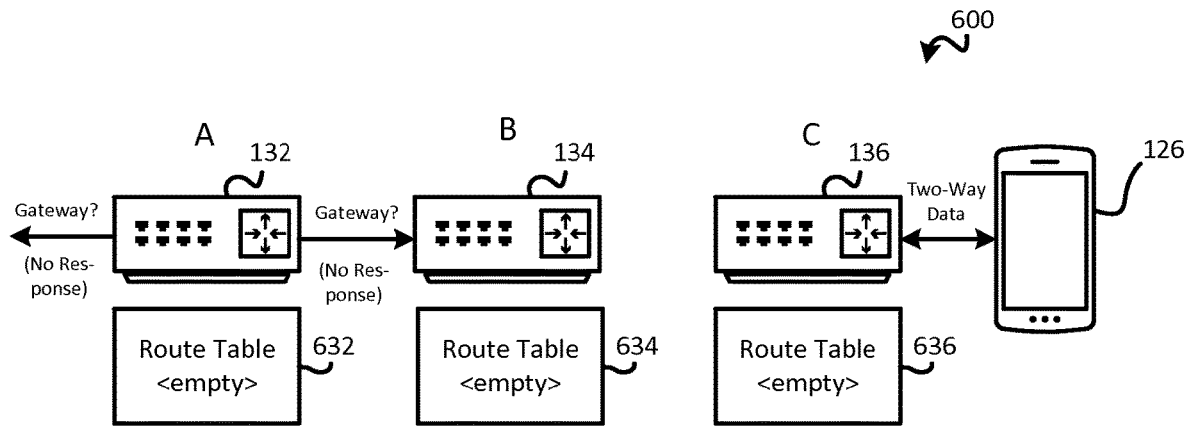
FIGS. 6A-6E are schematic block diagrams of a portion 600 of the system of FIG. 1, illustrating the identification of a gateway and path to an end-user device as in the method of FIG. 5.

In FIG. 6A, at the commencement of the method 500, the third end-user device 126 may be connected to the third node 136 via a connection by which two-way data transfer occurs, for example, via Ethernet. The third node 136 may have already appointed itself as a gateway per the method 300 of FIG. 3.

Since the first node 132 is not a gateway and has not identified a gateway, it may broadcast a gateway inquiry as in the step 554 of the method 500. Within the portion 600, only the second node 134 may be within direct wireless communication range of the first node 132. Accordingly, only the second node 134 may receive the gateway inquiry. Since the second node 134 is not a gateway and has not identified a gateway, the second node 134 may not respond to the gateway inquiry. The method 500, as performed by the first node 132, may terminate without resolving the query 580 in the affirmative, and thus without identifying a gateway.

Figure 6B:
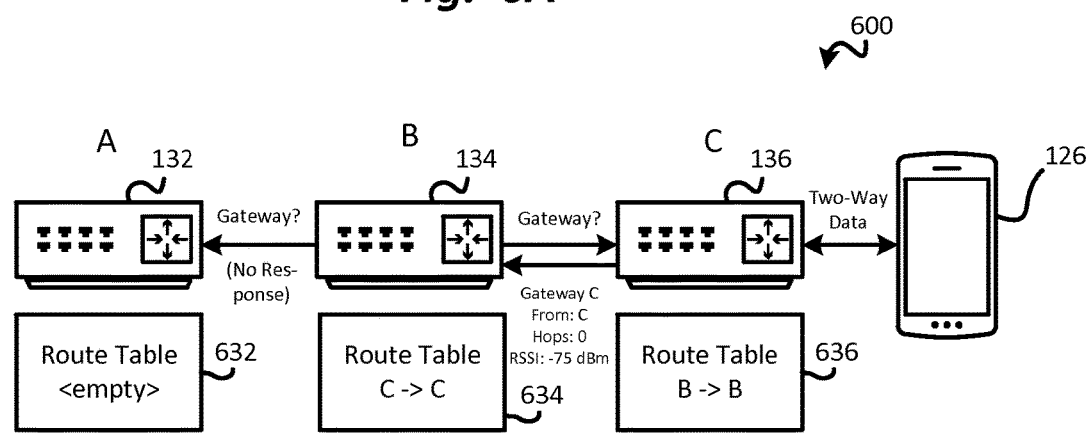

In FIG. 6B, the second node 134 may also perform the method 500.

The second node 134 is not a gateway and has not identified a gateway, so it may broadcast a gateway inquiry as in the step 554 of the method 500. Within the portion 600, the first node 132 and the third node 136 are within direct wireless communication range of the second node 134. The first node 132 may receive the gateway inquiry, but may not respond since it is not a gateway and has not identified a gateway.

However, the third node 136 may also receive the gateway inquiry, and has appointed itself a gateway. Thus, the third node 136 may create a route (use the second node 134 to reach the second node 134, or use node B to reach node B) in the third node route table 636. The third node 136 may also transmit a response to the gateway inquiry indicating that the third node 136 is a gateway 0 hops away. This response may be a unicast packet directed toward the second node 134.

The response may also contain additional data, such as a signal strength between the second node 134 and the third node 136, as measured by the third node 136. The signal strength may be measured by the third node 136 based on the quality of the signal in which the gateway inquiry is encoded. If desired, the signal strength may take the form of an RSSI level (received signal strength indication) or the like. As shown in FIG. 6B, the RSSI level embedded in the response to the second node 134 may be −75 dBm. In alternative embodiments, the RSSI between the inquiring node 132 and the responding node 134, the average RSSI of each hop in the path, the worst RSSI in the path, the overall weighted average RSSI in the path, and/or any other combination of RSSI values in the path may be used. Alternatively or additionally, the received channel power indicator (RCPI), signal-to-noise ratio, bit-to-noise ratio, or other signal strength measure may be used in place of or in addition to any of the RSSI values set forth above to determine the best path to get to a gateway node 136.

The second node 134 may receive the response from the third node 136 and may create a route back to the originator of the response, i.e., the third node 136 (use node C to reach node C) in the second node route table 634. The second node 134 may select the third node 136 as the gateway and may create and/or refresh a route (use node C to reach node C, since node C is the source of the response).

Figure 6C:
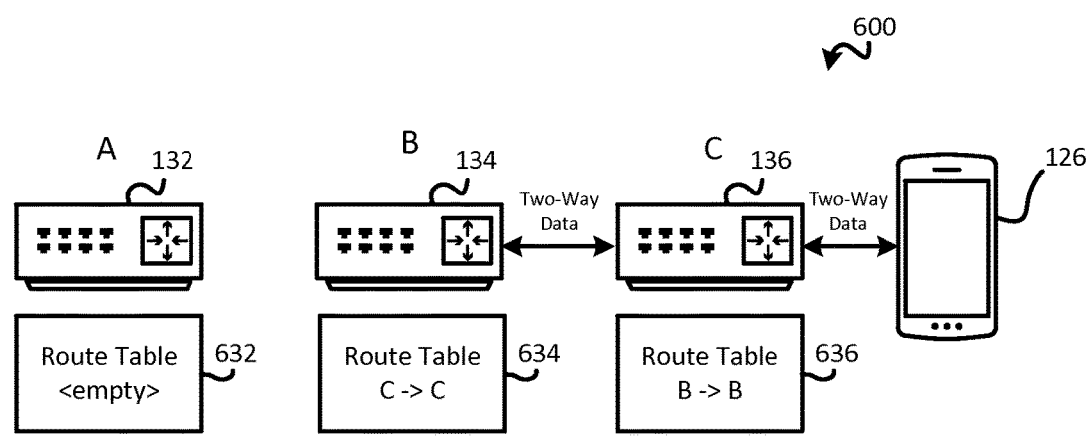

In FIG. 6C, data may be transmitted by second node 134 to the third end-user device 126 via the third node 136. The third end-user device 126 may transmit an acknowledgement of receipt of the data back to the second node 134 through the third node 136. Optionally, the third end-user device 126 may optionally transmit configurations to the second node 134 via the third node 136. The second node 134 may then transmit acknowledgement of the configurations back to the third end-user device 126 via the third node 136.

Figure 6D:
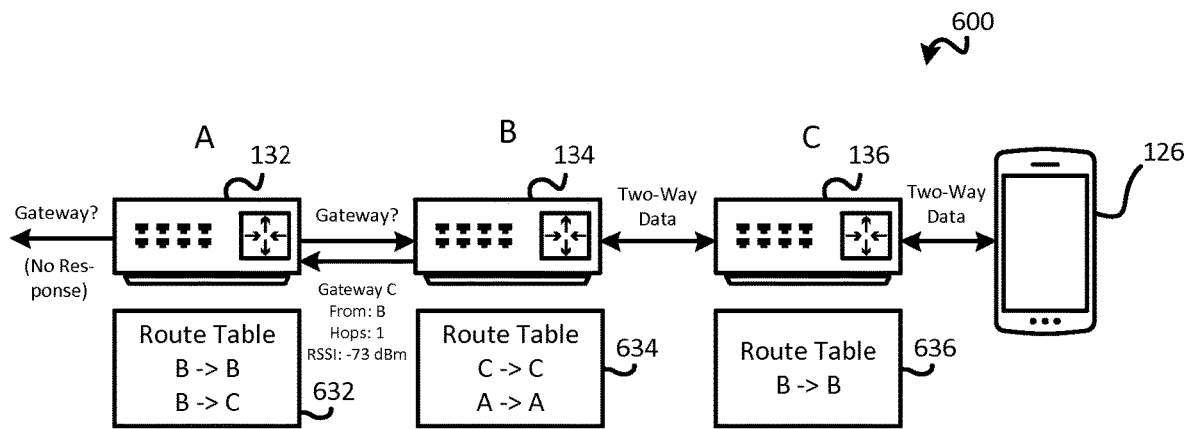

In FIG. 6D, the first node 132 may again transmit a gateway inquiry to the nodes 130 within its wireless communications range, per the step 554 of the method 500. The third node 136 may not be within the broadcast range of the first node 132, but the second node 134 may receive the gateway inquiry, and has identified a gateway (the third node 136). The second node 134 may create a route (use node A to reach node A) in the second node route table 634, and may respond to the gateway inquiry by indicating that the third node 136 is a gateway that is one hop away from the second node 134. This response may be a unicast packet directed toward the first node 132.

Like the response previously transmitted from the third node 136 to the second node 134, this response may encode a signal strength, which may be based on measurement by the second node 134 of the strength of the gateway inquiry from the first node 132. The RSSI value of this response may be −73 dBm, as indicated in FIG. 6D.

The first node 132 may receive the response from the second node 134 and may create a route back to the originator of the response (use node B to reach node B) in the first node route table 632. The first node 132 may also select the third node 136 as the gateway and create a route (use node B to reach node C) in the first node route table 632, since the response came from the second node 134.

Figure 6E:
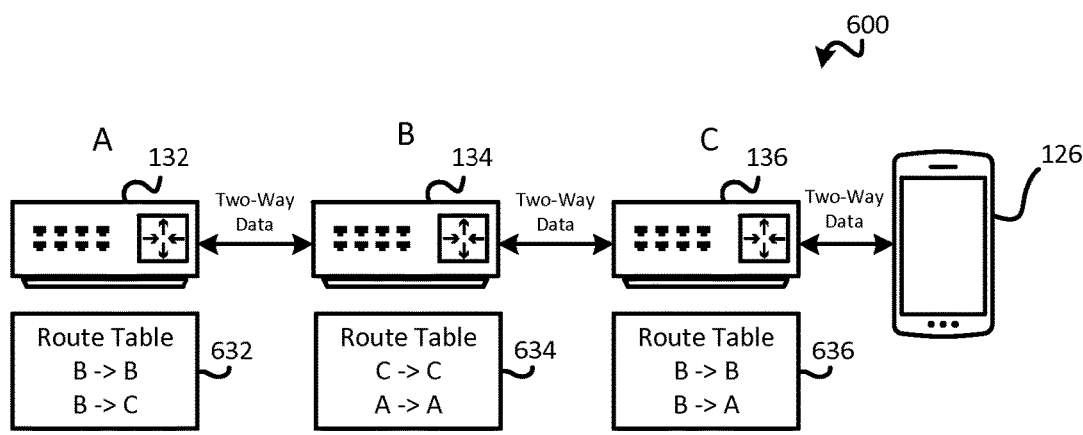

In FIG. 6E, the first node 132 may transmit data intended for the third end-user device 126 to the second node 134, for example, as a unicast packet. The second node 134 may forward the data to the third node 136. The third node 136 may receive the data and may create a route (use node B to reach node A) in the third node route table 636, since the packet originated at the first node 132 and was transmitted to the third node 136 by the second node 134. The third node 136 may forward the data to the third end-user device 126.

The third end-user device 126 may transmit an acknowledgement of receipt of the data back to the first node 132 through third node 136 and then the second node 134. Optionally, the third end-user device 126 may also transmit configurations to the first node 132 via the third node 136 and the second node 134. The first node 132 may transmit configuration acknowledgements to the third end-user device 126 via the reverse path (i.e., via the second node 134 and then the third node 136).

Returning briefly to FIG. 5, the step 585 involves the transmission of data via the best responding node 130, i.e., the node 130 that provides the best path to the third end-user device 126. Where multiple paths from a node 130 to a gateway are available, the node 130 transmitting the data may advantageously choose the transmission path in a way that minimizes factors such as the likely (1) packet loss, (2) congestion, (3) delivery time, and/or other factors over the transmission path. In some embodiments, this may be accomplished by favoring paths with a higher signal strength and/or a smaller number of wireless communication steps ("hops") to the end-user device 120.

Higher signal strength may mean higher RSSI measured by the third node 136, acting as a gateway, as inquiry packets are received (whose recorded RSSI may be passed to any other inquiring nodes 130 and used as the RSSI by those nodes 130 when responding to other nodes 130 broadcasting a gateway inquiry). Additionally or alternatively, higher signal strength may mean higher RSSI measured by the inquiring node 130 from a response from a node 130, such as the second node 134, which had identified a gateway.

Additionally or alternatively, higher signal strength may mean higher average RSSI calculated at least in part by summing the RSSI recorded by each node 130 in the path upon receiving a response to its inquiry or receiving an acknowledgement from an end-user device such as the third end-user device 126). Additionally or alternatively, higher signal strength may mean higher worst case RSSI as recorded by each node 130 in the path upon receiving a response to a gateway inquiry.

Additionally or alternatively, higher signal strength may mean higher weighted RSSI determined by applying weights to different RSSI values and/or ranges. For example, each RSSI range may be given a weight based on approximate packet loss percentage for two communicating nodes 130 measuring an RSSI in that range, and summing the weighted RSSI values calculated from each node's recorded original RSSI measured on receiving a response to a gateway inquiry.

Additionally or alternatively, higher signal strength may mean lower penalty sum determined by applying penalties to different RSSI values and/or ranges of RSSI values. For example, each RSSI range may be given a penalty value based on approximate packet loss percentage for two communicating nodes 130 measuring an RSSI in that range, and summing the penalty values calculated from each node's recorded original RSSI measured on receiving a response to a gateway inquiry.

Any of the foregoing signal strength comparisons may be made through the use of other measures besides RSSI. Thus, RCPI and/or any other signal strength measure may be applied in addition to or in place of the use of RSSI as set forth above.

One way in which the "best" identified path may be selected will be shown and described in connection with FIG. 7. Two path selection examples will then be shown and described in connection with FIGS. 8A-8B and FIGS. 9A-9B, respectively.

Figure 7:
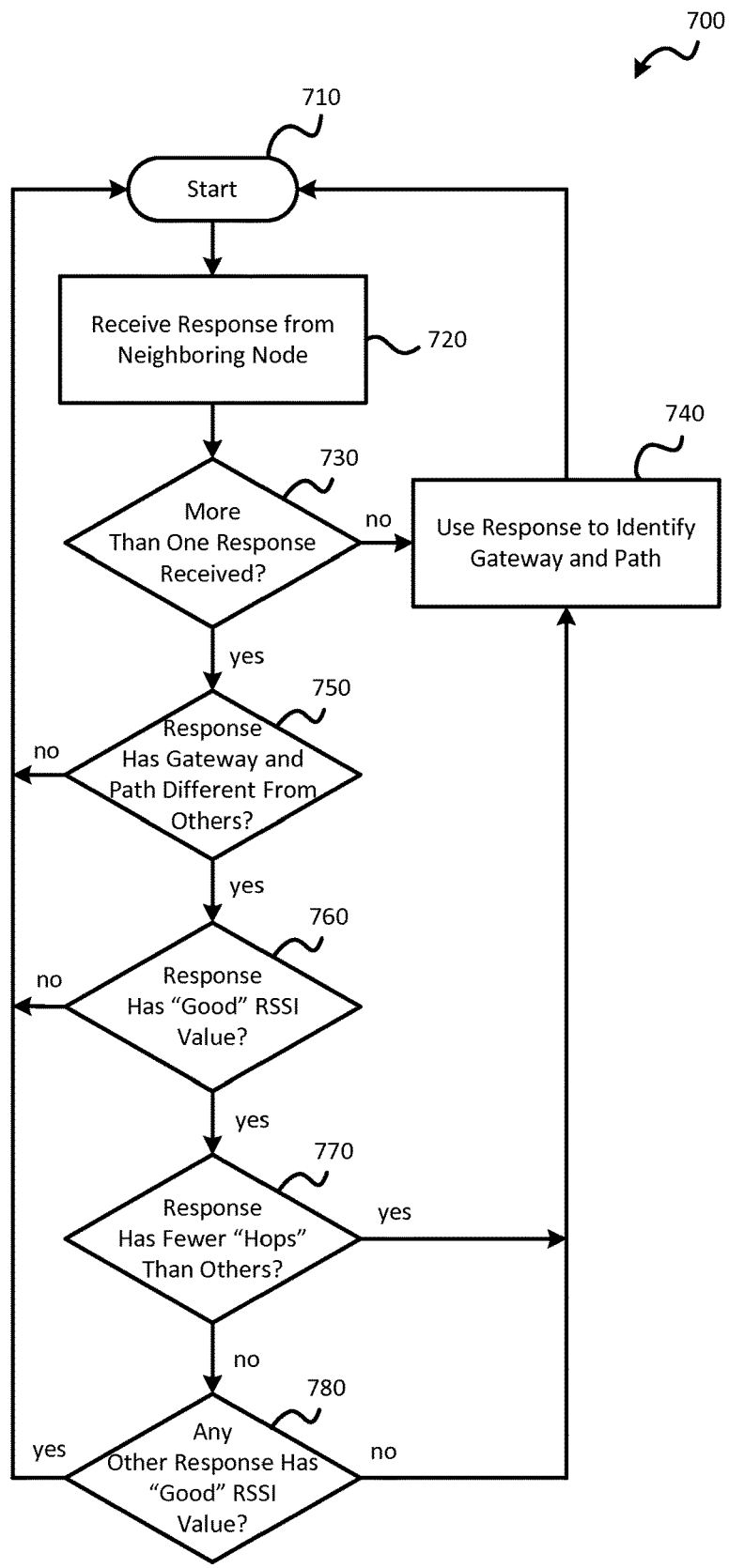
FIG. 7 is a flowchart diagram of a method of evaluating a path to a gateway of the system of FIG. 1.

Referring to FIG. 7, a flowchart diagram illustrates a method 700 of evaluating a path to a gateway of the system 100 of FIG. 1. The method 700 may be used to determine which path most effectively minimizes packet loss, traffic, and/or transmission time.

As shown, the method 700 may start 710 with a step 720 in which the node 130, for example, the first node 132, receives a response from one of the nodes 130 that is a neighbor to it. If desired, the first node 132 may wait for the passage of a predetermined period of time to enable it to receive all responses from the nodes 130 that are neighbors to it. Then, in a query 730, the first node 132 may determine whether more than one response has been received.

If only one response has been received by the first node 132, the method 700 may proceed to a step 740 in which the new response is used to identify a gateway and path to reach the gateway from the first node 132. This may entail recording the gateway and/or path in the route table for the first node 132 (for example, in the first node route table 632 of FIGS. 6A-6E). Since no other responses were received, the response may present the only viable pathway to the gateway from the first node 132. The method 700 may return to the start 710 so that the first node 132 may continue attempting to identify a path superior to that which has been identified.

If more than one response has been received by the first node 132, the method 700 may instead proceed to a query 750 in which the first node 132 determines whether the response contains a gateway and/or path different from those already identified. This may be done, for example, by comparing the path embodied in the response with those recorded in the first node route table 632.

If the response does not have a gateway and/or path different from those already identified, the information in the response may be duplicative for the first node 132. Thus, the method 700 may proceed back to the start 710 so that the first node 132 may continue attempting to identify paths superior to those on the first node route table 632.

If the response has a gateway and/or path different from those already identified, the method 700 may instead proceed to a query 760 in which the first node 132 determines whether the response has an acceptable signal strength. This may entail (1) measuring the signal strength of the response to determine whether the response, itself, has a "good" RSSI value, and/or (2) determining whether the response encodes a "good" RSSI value, representing the measurement of the node 130 that transmitted the response of the signal strength of the gateway inquiry.

The "good" RSSI value may be predetermined for the system 100 as a whole, or selected for individual nodes 130 of the system 100. If desired, the minimum acceptable RSSI value may be empirically determined, as will be shown and described in connection with FIG. 11.

If the RSSI value of the response is not acceptable the method 500 may return to the start 510 to enable the first node 132 to receive other responses prior to selection of a path. If the RSSI value of the response is acceptable, the method 500 may proceed to a query 770 in which the first node 132 determines whether the path in the response has fewer "hops" than others previously identified by the first node 132. Again, the response may be compared with the first node route table 632 to determine whether the new path has fewer hops than those previously identified by the first node 132.

If the path in the response has few hops than the paths previously identified by the first node 132, the method 700 may proceed to the step 740 in which the new response is used to identify a gateway and path for future use. The method 700 may then return to the start 710.

If the path in the response does not have fewer hops than paths previously identified by the first node 132, the method 700 may instead proceed to a query 780 in which the first node 132 determines whether any other response received by the first node 132 has a path with a "good" RSSI value. This may be done by checking the first node route table 632 for a path to the desired gateway with a "good" RSSI value.

If a path from another response has a "good" RSSI value, the method 700 may return to the start 710, since the path provided by the new response is no better than those previously recorded by the first node 132. Conversely, if no path from another response received by the first node 132 has a "good" RSSI value, the method 700 may proceed to the step 740 in which the new response is used to identify a gateway and path for future use. The method 700 may then return to the start 710.

Figure 8A:
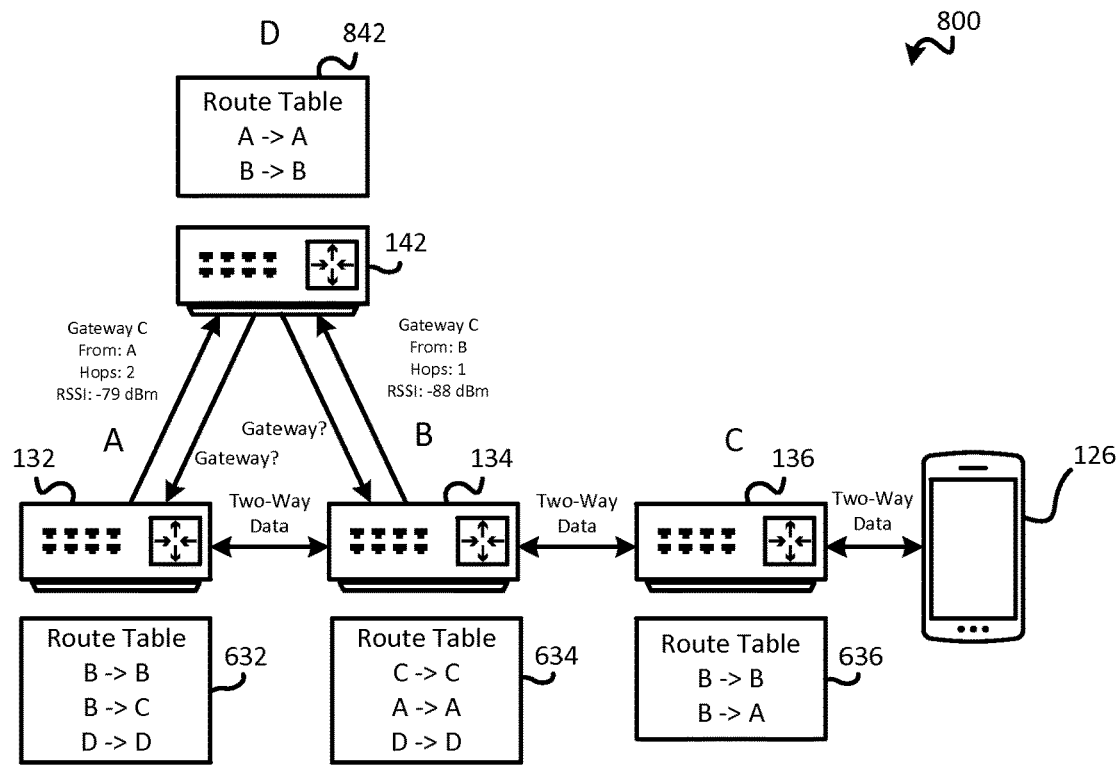
FIGS. 8A and 8B are schematic block diagrams of a portion of the system of FIG. 1, illustrating the identification of a first path to an end-user device as in the method of FIG. 7.
Figure 8B:
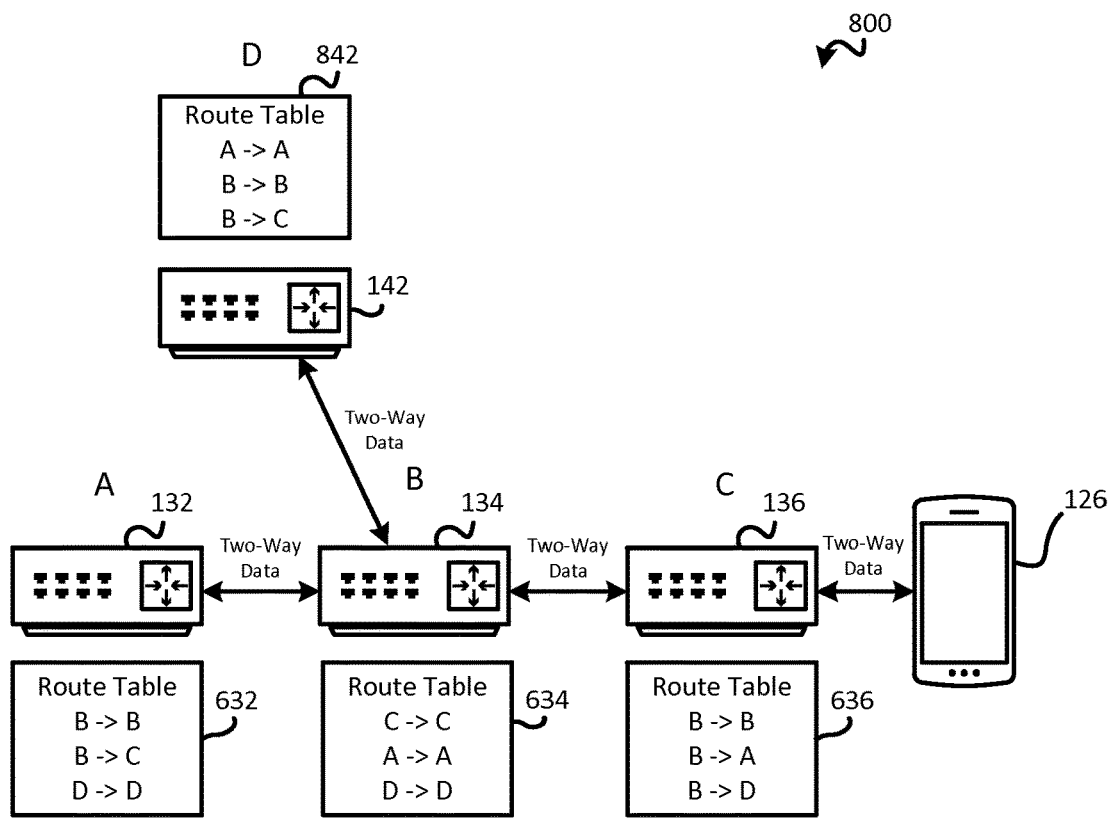

Referring to FIGS. 8A and 8B, schematic block diagrams illustrate a portion 800 of the system 100 of FIG. 1, illustrating the identification of a first path to one of the end-user devices 120, as in the method 700 of FIG. 7. Like the portion 600 of FIGS. 6A-6E, the portion 800 may include the first node 132, the second node 134, and the third node 136 of FIG. 1. The portion 800 may also include the fifth node 142 of FIG. 1. The fifth node 142 may have a fifth node route table 842, and is labeled "D" in FIGS. 8A-8B.

The first node 132, the second node 134, and the third node 136 may be in the same condition as in FIG. 6E, after completion of the method 500 by the first node 132, the second node 134, and the third node 136 as described in connection with FIGS. 6A-6E. In FIG. 8A, the fifth node 142 may have just been moved within wireless communication range of the first node 132 and the second node 134.

In FIG. 8A, the fifth node 142 may transmit a gateway inquiry, which may be received by the first node 132 and the second node 134 because they are within the direct wireless communication range of the fifth node 142. The third node 136 may not receive the gateway inquiry because it is out of range.

The first node 132 may receive the gateway inquiry and may create a route (use node D to reach node D) in the first node route table 632. The first node 132 has previously identified the third node 136 as the gateway (in FIG. 6D) and may thus transmit a response to the gateway inquiry to the fifth node 142. The response may be a unicast packet directed at the fifth node 142, and may indicate that the gateway is the third node 136, which is two hops from the first node 132. It may also have an RSSI value of −79 dBm.

In FIG. 8B, the fifth node 142 may receive the response and may create a path back to the originator of the response. Thus, the fifth node 142 may create a corresponding route (use node A to reach node A) in the fifth node route table 842. Since only the first node 132 has responded to the gateway inquiry so far, the fifth node 142 may, in the performance of the method 700, answer the query 730 in the negative. Thus, node A may be chosen as the current gateway and path. The gateway, path, number of hops, and RSSI value may all be stored by the fifth node 142.

Returning to FIG. 8A, the second node 134 may also receive the gateway inquiry and may create a route (use node D to reach node D) in the second node route table 634. The second node 134 has previously identified the third node 136 as the gateway (in FIG. 6B) and may thus transmit a response to the gateway inquiry to the fifth node 142. The response may be a unicast packet directed at the fifth node 142, and may indicate that the gateway is the third node 136, which is one hop from the second node 134. It may also have an RSSI value of −88 dBm.

In FIG. 8B, the fifth node 142 may receive the response and may create a path back to the originator of the response. Thus, the fifth node 142 may create a corresponding route (use node A to reach node A) in the fifth node route table 842. The fifth node 142 has now received more than one response to the gateway inquiry, and may thus answer the query 730 in the affirmative. The path provided by the second node 134 is different from that previously recorded through the first node 132, so the query 750 may also be answered affirmatively. Assuming a minimum "good" RSSI value is −90 dBm, the query 760 may also be answered affirmatively. Both responses have an acceptable signal strength.

Pursuant to the query 770, the fifth node 142 may determine that the more recent response from the second node 134 has a path with fewer hops than that previously recorded through the first node 132. Thus, the path of the new response may be identified as the desired path for communications to the third node 136, and thence, to the third end-user device 126. If desired, the fifth node 142 may wait for a predetermined period of time to receive and/or evaluate other responses prior to making the gateway and path selection.

Figure 9A:
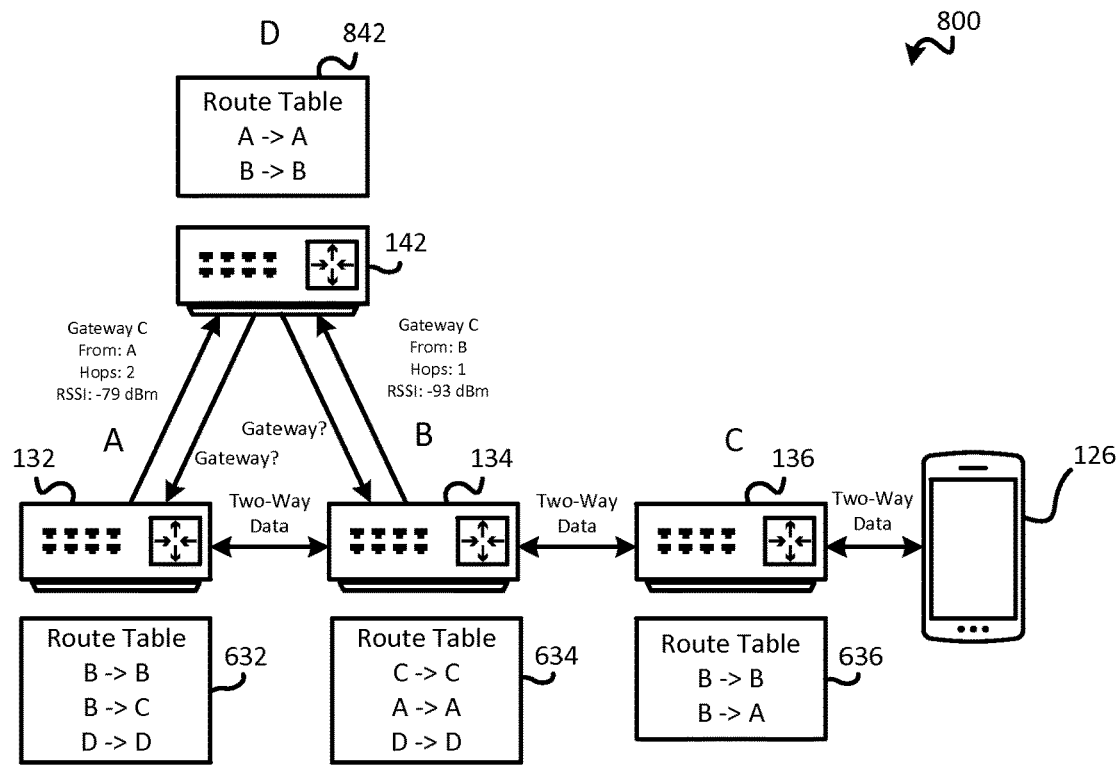
FIGS. 9A and 9B are schematic block diagrams of a portion of the system of FIG. 1, illustrating the identification of a second path to an end-user device as in the method of FIG. 7.
Figure 9B:
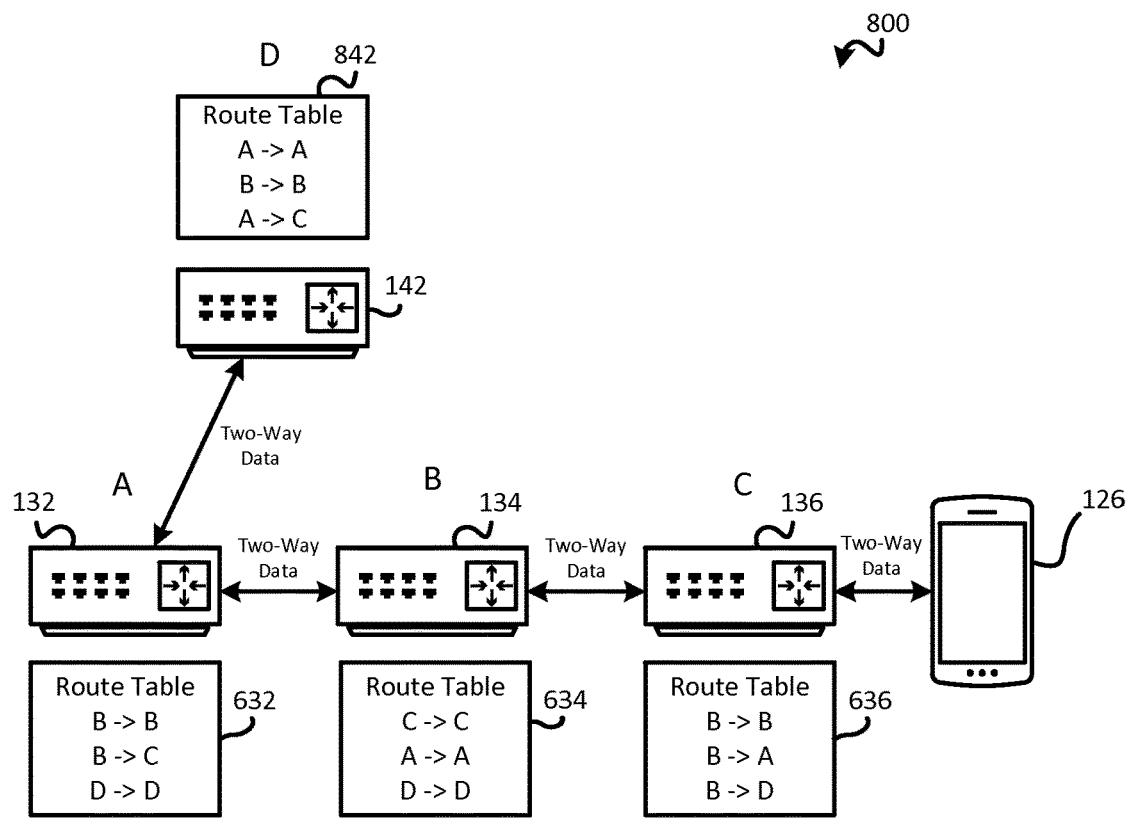

Referring to FIGS. 9A and 9B, schematic block diagrams illustrate the portion 800 of the system 100 of FIG. 1, illustrating the identification of a second path to one of the end-user devices 120, as in the method 700 of FIG. 7. The portion 800 may be the same as shown in FIG. 8A, and the condition of the portion 800 may also be the same as in FIG. 8A. Thus, the first node 132, the second node 134, and the third node 136 may be in the same condition as in FIG. 6E, after completion of the method 500 by the first node 132, the second node 134, and the third node 136 as described in connection with FIGS. 6A-6E. The fifth node 142 may have just been moved within wireless communication range of the first node 132 and the fifth node 142.

In FIG. 9A, the fifth node 142 may transmit a gateway inquiry, which may be received by the first node 132 and the second node 134 because they are within the direct wireless communication range of the fifth node 142. The third node 136 may not receive the gateway inquiry because it is out of range.

The first node 132 may receive the gateway inquiry and may create a route (use node D to reach node D) in the first node route table 632. The first node 132 has previously identified the third node 136 as the gateway (in FIG. 6D) and may thus transmit a response to the gateway inquiry to the fifth node 142. The response may be a unicast packet directed at the fifth node 142, and may indicate that the gateway is the third node 136, which is two hops from the first node 132. It may also have an RSSI value of −79 dBm.

In FIG. 9B, the fifth node 142 may receive the response and may create a path back to the originator of the response. Thus, the fifth node 142 may create a corresponding route (use node A to reach node A) in the fifth node route table 842. Since only the first node 132 has responded to the gateway inquiry so far, the fifth node 142 may, in the performance of the method 700, answer the query 730 in the negative. Thus, node A may be chosen as the current gateway and path. The gateway, path, number of hops, and RSSI value may all be stored by the fifth node 142.

Returning to FIG. 9A, the second node 134 may also receive the gateway inquiry and may create a route (use node D to reach node D) in the second node route table 634. The second node 134 has previously identified the third node 136 as the gateway (in FIG. 6B) and may thus transmit a response to the gateway inquiry to the fifth node 142. The response may be a unicast packet directed at the fifth node 142, and may indicate that the gateway is the third node 136, which is one hop from the second node 134. It may also have an RSSI value of −93 dBm.

In FIG. 9B, the fifth node 142 may receive the response and may create a path back to the originator of the response. Thus, the fifth node 142 may create a corresponding route (use node A to reach node A) in the fifth node route table 842. The fifth node 142 has now received more than one response to the gateway inquiry, and may thus answer the query 730 in the affirmative. The path provided by the second node 134 is different from that previously recorded through the first node 132, so the query 750 may also be answered affirmatively.

However, assuming a minimum "good" RSSI value is −90 dBm, the query 760 may be answered negatively. The response from the second node 134 does not have an acceptable signal strength. Thus, the response from the second node 134 may be discarded and the fifth node 142 may continue to route communications with the third end-user device 126 through the first node 132. If desired, the fifth node 142 may wait for a predetermined period of time to receive and/or evaluate other responses prior to making the gateway and path selection.

Advantageously, the system 100 may be able to detect problems and "self-heal." For example, if one of the end-user devices 120 is moved, one of the nodes 130 is moved out of range of one or more other nodes 130 with which it used to connect, or the like, the nodes 130 involved may actively take steps to identify new gateways and/or paths. One method for accomplishing this will be shown and described in connection with FIG. 10.

Figure 10:
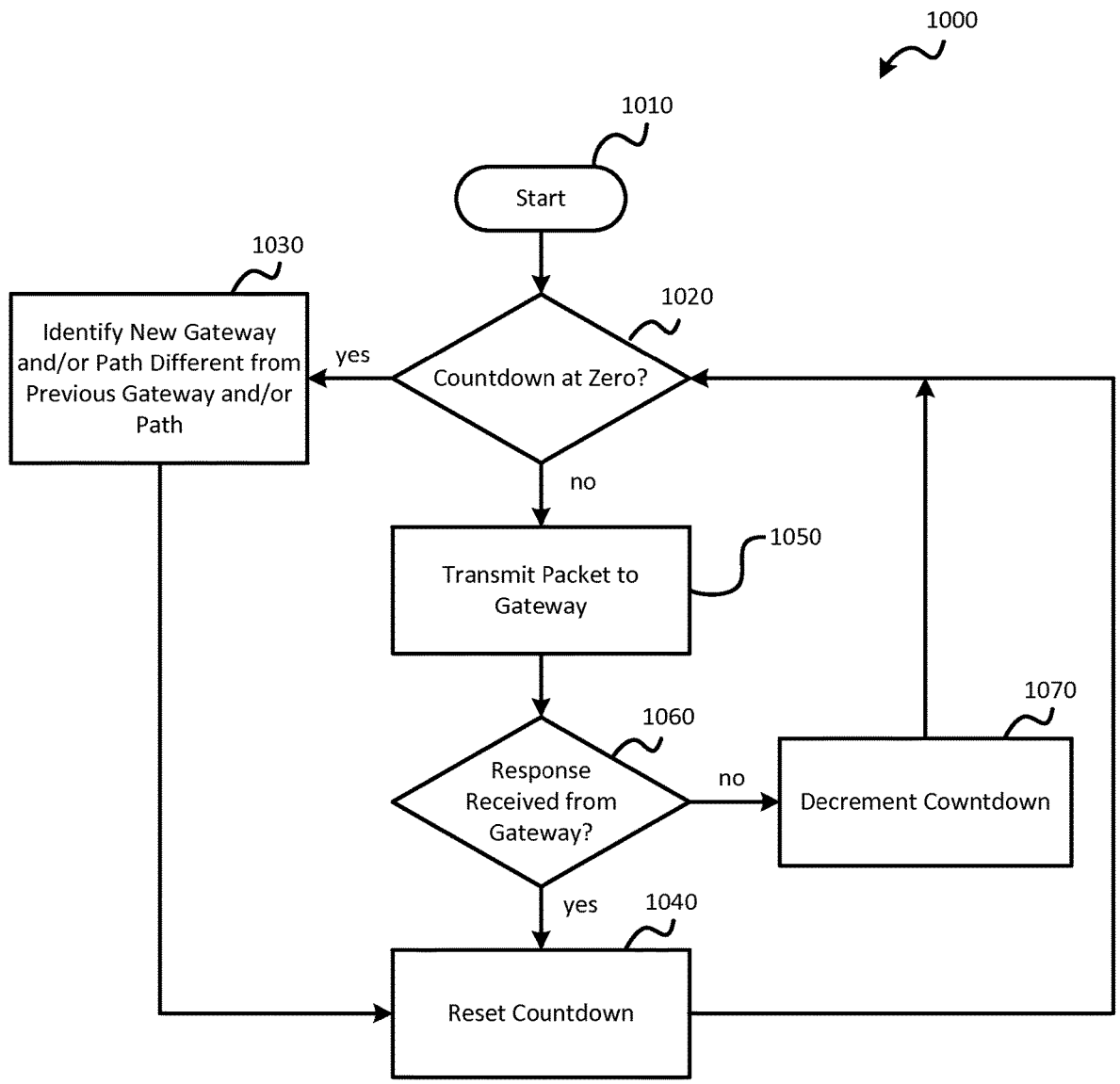
FIG. 10 is a flowchart diagram of a method of determining whether a new gateway and/or path of the system of FIG. 1 need to be identified.

Referring to FIG. 10, a flowchart diagram illustrates a method 1000 of determining whether a new gateway and/or path of the system 100 of FIG. 1 need to be identified. The method 1000 may be performed periodically, if desired, by each of the nodes 130 to ensure that all identified paths and/or gateways are still usable, and replace any that are not usable.

As shown, the method 1000 may start 1010 with a query 1020 in which the node 130 (for example, the first node 132) determines whether a countdown maintained by the first node 132 is at zero. The countdown may begin at a predetermined number, with a larger number corresponding to a higher degree of "patience" exercised by the first node 132 before it determines that a gateway and/or path is no longer valid.

If, pursuant to the query 1020, the first node 132 determines that the countdown has reached zero, the method 1000 may proceed to a step 1030 in which the first node 132 identifies a new gateway and/or path, different from the faulty gateway and/or path. Identification of the new gateway and/or path may be carried out, for example, using the method 500 of FIG. 5. Optionally, the method 500 may be modified such that the first node 132 ignores any response received that contains the old (presumed faulty) path.

Once a new gateway and/or path have been identified, the method 1000 may proceed to a step 1040 in which the countdown is reset. The method 1000 may then return to the query 1020 so that the first node 132 continuously checks the new gateway and/or path for proper communication.

If, pursuant to the query 1020, the countdown has not reached zero, the method 1000 may proceed to a step 1050 in which the first node 132 transmits a packet to the gateway over the path. Then, in a query 1060, the first node 132 may determine whether a response has been received to acknowledge receipt of the packet. If no such response is received, for example, within a predetermined time limit, the method 1000 may proceed to a step 1070 in which the countdown is decremented.

Accordingly, after a predetermined number of packets are sent to the gateway, along the path, per the step 1050 with no response, the first node 132 will assume that the path and/or gateway are faulty and identify a new gateway and/or path in the step 1030. Hence, the first node 132 may adapt autonomously and relatively rapidly to changing conditions within the system 100.

Figure 11:
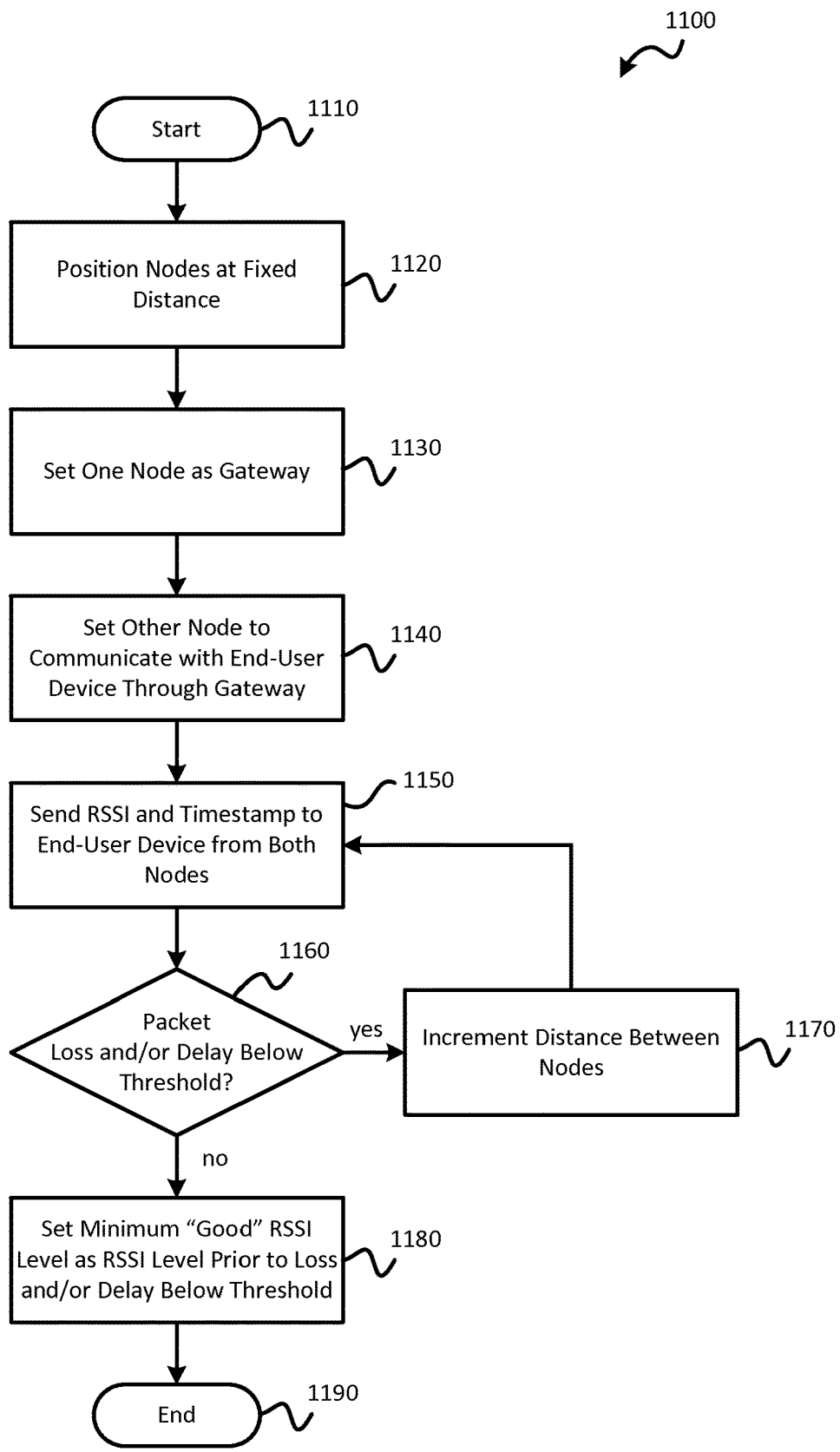
FIG. 11 is a flowchart diagram of a method of setting a minimum acceptable signal strength for the system of FIG. 1.

The performance of some methods according to the invention may require a minimum acceptable signal strength. For example, in the method 700 of FIG. 7, the minimum acceptable signal strength (the "good" RSSI value) may be used to carry out the query 760 and/or the query 780. This minimum signal strength may be hard-coded into each of the nodes 130, or may be dynamically managed. If desired, the minimum acceptable signal strength may be established for the entire system 100, and may be selected based upon the location, configuration, user requirements, and/or other parameters of the operation of the system 100. FIG. 11 illustrates one method of determining a minimum acceptable signal strength for a system 100.

Referring to FIG. 11, a flowchart diagram illustrates a method 1100 of setting a minimum acceptable signal strength for the system 100 of FIG. 1. The method 1100 may, according to one example, be carried out at the time the system 100 is installed and/or configured for initial use. If desired, the method 1100 may be carried out on-site, i.e., in the location in which the system 100 will be used.

The method 1100 may start 1110 with a step 1120 in which two of the nodes 130 (for example, the first node 132 and the second node 134) are positioned at a fixed distance apart. This distance may be small enough that the first node 132 and the second node 134 are sure to have an acceptable packet loss rate.

Then, in a step 1130, one of the nodes 130 (for example, the second node 134) may be set as a gateway. This may be done by connecting it to an end-user device 120 such as the second end-user device 124, and then allowing the second node 134 to follow the method 300 of FIG. 3 to appoint itself as a gateway for the second end-user device 124.

Then, in a step 1140, the first node 132 may then be set to communicate with the second end-user device 124 via gateway, i.e., the second node 134. This may be done by activating the first node 132 and allowing it to follow the procedure of the method 500 of FIG. 5 to determine that the second node 134 is a gateway for the second end-user device 124. In the alternative to the foregoing, the step 1130 and/or the step 1140 may be carried out manually, for example, by copying the desired information manually to the first node route table 632 of the first node 132 and/or the second node route table 634 of the second node 134. Such manual connection may be facilitated by the presence of the user input 260 and the user output 270 on the first node 132 and/or the second node 134, which presence is optional as mentioned previously.

Once the first node 132 and the second node 134 have been configured for communication as outlined above, the method 1100 may proceed to a step 1150 in which data is sent from the first node 132 and the second node 134 to the second end-user device 124. The data may include the RSSI value and/or the time stamp associated with each wireless transmission.

Then, in a query 1160, the method 1100 may determine whether the packet loss and/or delay for the data transmitted from the first node 132 and/or the second node 134 is below an acceptable level. According to one embodiment, this acceptable packet loss level may be 10%. An acceptable delay may also be determined; if the packet is received too late, the query 1160 may be answered in the positive.

If the packet loss and/or delay of the data transmitted from the first node 132 and/or the second node 134 are at or below the acceptable packet loss level, the method 1100 may proceed to a step 1170 in which the distance between the first node 132 and the second node 134 is incremented. This may be done, for example, by moving the first node 132 and/or the second node 134 away from the other. If desired, a fixed increment (for example, five feet) may be used for each iteration of the step 1170. The method 1100 may then return to the step 1150 so that new data transmissions are made with the first node 132 and the second node 134 at the greater displacement relative to each other.

Once the packet loss and/or delay are no longer below the threshold, the method 1100 may proceed to a step 1180. In the step 1180, the RSSI levels for the data transmissions to the second end-user device 124 as the last good relative displacement, i.e., the last RSSI levels received by the second end-user device 124 before the first node 132 and the second node 134 were moved to a relative displacement causing excessive packet loss, may be used as the minimum acceptable RSSI level (the "good" RSSI level). If desired, the RSSI levels of the data transmissions from the first node 132 and the second node 134 may be averaged together to obtain this minimum acceptable RSSI level. Additionally or alternatively, the maximum or minimum RSSI level obtained from the first node 132 and the second node 134 may be used as the minimum acceptable RSSI level for the system 100.

This "good" RSSI level may then be encoded on the nodes 130 of the system. It may then be used by the nodes 130 to make decisions, such as the query 760 and the query 780 of the method 700 of FIG. 7.

It may further be desirable for each node 130 to facilitate the discovery of changes in the system 100 by other nodes by broadcasting information about such changes when they occur. Certain trigger events may cause a node 130 to broadcast notice of the event to other nodes; in this way, notice of the change may propagate through the system 100. One example of such a notification system will be shown and described in connection with FIG. 12.

Referring to FIG. 12, a flowchart diagram illustrates a method 1200 of transmitting notice through the system 100 of FIG. 1 that a node is no longer a gateway. For example, if the first node 132 follows the method 300 of FIG. 3 to appoint itself as a gateway, and subsequently follows the method 400 of FIG. 4 to unappoint itself as a gateway, the method 1200 may be used to notify the other nodes 130 of the system 100 of the unappointment.

The method 1200 may start 1210 with a query 1220 in which the first node 132 determines whether the first node 132 has been unappointed as a gateway. If the first node 132 has been unappointed as a gateway, for example, through the use of the method 400 of FIG. 4, the method 1200 may proceed to a step 1230 in which the first node 132 transmits notice of the unappointment to the nodes 130 that are within its direct wireless communication range (its neighbors). Thus, the step 1230 may entail a broadcast of the notice to any node 130 within range.

Once the step 1230 has been carried out, the method 1200 may return to the start 1210. The method 1200 may be carried out iteratively, for example, after the passage of a predetermined amount of time after the performance of the last iteration.

If, pursuant to the query 1220, the first node 132 determines that it has not been unappointed as a gateway, the method 1200 may proceed to a query 1240 in which the first node 132 determines whether it has received notice of unappointment from one of its neighbors. If such a notice has been received by the first node 132, the method 1200 may proceed to a step 1250 in which notice of the unappointment may be transmitted to the nodes 130 in range of it, or alternatively, to the nodes 130 that use it as a gateway.

The first node 132 may then return to the start 1210 and iterate through the method 1200 again. Similarly, if the query 1240 is answered in the negative, the method 1200 may return to the start 1210.

In this manner, the nodes 130 may propagate notice of unappointment of the first node 132 as a gateway. Each of the nodes 130 may, in response, delete the corresponding path from its route table, causing it to identify a new gateway and path as in the method 500 of FIG. 5.

The claims are not limited to the specific implementations described above. Various modifications, changes and variations may be made in the arrangement, operation and details of the implementations described herein without departing from the scope of the claims.

What is claimed is:

1. A computer program product for dynamically establishing a gateway for end-user communication in a wireless mesh network, the computer program product comprising:
   a non-transitory storage medium; and
   computer program code encoded in the non-transitory storage medium, wherein the computer program code is executable by one or more processors and causes a first node of the wireless mesh network to perform the steps of:
      detecting a connection to an end-user device, wherein the end-user device is external to the wireless mesh network, and wherein detecting the connection to the end-user device includes checking the first node for activity and determining that the activity is not communication with another node in the wireless mesh network; and
      as a result of detecting the connection to the end-user device, the first node automatically appointing itself as a gateway for network communications with the end-user device and transmitting a first notification to a second node of the wireless mesh network, indicating that the first node is the gateway for network communications with the end-user device;
      determining, after the first node automatically appointed itself as the gateway for network communications with the end-user device and transmitting the first notification to the second node, that a non-mesh interface of the first node is not active, wherein the non-mesh interface of the first node is configured to communicate with devices external to the wireless mesh network;
      as a result of determining that the non-mesh interface of the first node is not active, the first node automatically unappointing itself as the gateway for network communications with the end-user device;
   wherein the computer program code is further executable by the one or more processors to cause the second node of the wireless mesh network to perform the steps of:
      receiving the first notification; and
      as a result of receiving the first notification, transmitting data to the end-user device via the first node.

2. The computer program product of claim 1, wherein the computer program code is further configured to cause the second node, prior to receipt of the first notification, to transmit a first inquiry to a first plurality of nodes of the wireless mesh network in direct communication with the second node;
   wherein the first plurality of nodes comprises the first node;
   wherein the first notification is transmitted by the first node to the second node in response to the first inquiry;
   wherein the computer program code is further configured to cause a third node of the wireless mesh network, after receipt of the first notification, to perform the steps of:
      transmitting a second inquiry to a second plurality of nodes in direct communication with the third node;
      wherein the second plurality of nodes comprises the second node and excludes the first node;
   wherein the computer program code is further configured to cause the second node to transmit a second notification to the third node, indicating that the first node is a gateway to the end-user device;
   wherein the computer program code is further configured to cause the third node to perform the steps of:
      receiving the second notification; and
      in response to receipt of the second notification, transmitting data to the end-user device via the second node and the first node.

3. The computer program product of claim 2, wherein the computer program code is further configured to cause a fourth node of the wireless mesh network to transmit a third notification to the third node, indicating that the first node is a gateway to the end-user device;
   wherein the computer program code is further configured to cause the third node, after receipt of the second notification, to perform the steps of:
      receiving the third notification;
      comparing a first path from the third node to the first node via the second node, with a second path from the third node to the first node via the fourth node; and
      in response to comparison of the first path with the second path, determining that the first path is likely to provide data transmission superior to that provided by the second path;
      wherein transmission of the data to the end-user device via the second node and the first node is further carried out in response to the determination.

4. The computer program product of claim 2, wherein the computer program code is further configured to cause the third node to perform the steps of:
   determining that a response to transmission of data to the end-user device via the second node and the first node has not been received; and
   in response to determining that the response has not been received, transmitting a third inquiry to the second plurality of nodes;
   wherein the second plurality of nodes comprises a fourth node of the wireless mesh network;
   wherein the computer program code is further configured to cause the fourth node to transmit a third notification to the third node, indicating that the first node is a gateway to the end-user device;
   wherein the computer program code is further configured to cause the third node to perform the steps of:
      receiving the third notification; and
      in response to receipt of the third notification, transmitting data to the end-user device via the fourth node and the first node.

5. The computer program product of claim 1, wherein the computer program product is further configured to cause the first node to perform the steps of:
- determining that a condition is true, wherein the condition is selected from the group consisting of:
  - that the connection to the end-user device has been terminated; and
  - that a response has not been received by the first node from the end-user device within a predetermined time frame after transmission of data from the first node to the end-user device; and
- in response to determining that the condition is true, transmitting a second notification to the second node, indicating that the first node is not a gateway to the end-user device.

6. A wireless mesh network system, comprising:
a first node configured to:
- detect a connection to an end-user device, wherein the end-user device is external to the wireless mesh network system, and wherein detecting the connection to the end-user device includes checking the first node for activity and determining that the activity is not communication with another node in the wireless mesh network system; and
- as a result of the detection of the connection, the first node automatically appoints itself as a gateway for network communications with the end-user device and transmit a first notification to a second node of the wireless mesh network system, indicating that the first node is the gateway for network communications with the end-user device wherein network communications with the end-user device are routed through a node that is appointed as a gateway; and the second node configured to:
- prior to receipt of the first notification, transmit a first inquiry to a first plurality of nodes of the wireless mesh network system in direct communication with the second node, wherein the first plurality of nodes comprises the first node and the first notification is transmitted by the first node to the second node in response to the first inquiry;
- receive the first notification;
- in response to receipt of the first notification, transmit data to the end-user device via the first node; and
- transmit a second notification to a third node, wherein the second notification indicates that the first node is the gateway to the end-user device;

the third node configured to:
- after receipt of the first notification by the second node, transmit a second inquiry to a second plurality of nodes of the wireless mesh network system in direct communication with the third node, wherein the second plurality of nodes comprises the second node and excludes the first node and wherein the second plurality of nodes comprises a fourth node;
- wait for a predetermined period of time for responses to the second inquiry;
- receive, during the predetermined period of time, the second notification;
- receive, during the predetermined period of time, a third notification from the fourth node, wherein the third notification indicates that the first node is the gateway to the end-user device;
- compare, after the predetermined period of time, a first path from the third node to the first node via the second node with a second path from the third node to the first node via the fourth node; and
- transmit, based on comparing the first path with the second path, data to the end-user device via the second node and the first node; and the fourth node configured to:
- receive the second inquiry; and
- transmit, in response to the second inquiry, the third notification.

7. The wireless mesh network system of claim 6, wherein comparing the first path with the second path comprises:
- determining that the first path comprises a first number of hops from the third node to the first node;
- determining that the second path comprises a second number of hops from the third node to the first node; and
- determining that the second number of hops is greater than the first number of hops.

8. The wireless mesh network system of claim 6, wherein the third node is further configured to:
- determine that a response to transmission of data to the end-user device via the second node and the first node has not been received; and
- in response to determining that the response has not been received, transmit a third inquiry to the second plurality of nodes;
- receive a fourth notification from the fourth node; and
- in response to receipt of the fourth notification, transmit data to the end-user device via the fourth node and the first node.

9. The wireless mesh network system of claim 6, wherein the first node is further configured to:
- determine that a condition is true, wherein the condition is selected from the group consisting of:
  - that the connection to the end-user device has been terminated; and
  - that a response has not been received by the first node from the end-user device within a predetermined time frame after transmission of data from the first node to the end-user device; and
- in response to determining that the condition is true, transmit a fourth notification to the second node, indicating that the first node is not a gateway to the end-user device.

* * * * *